US010250674B2

(12) United States Patent
Zhang et al.

(10) Patent No.: US 10,250,674 B2
(45) Date of Patent: Apr. 2, 2019

(54) RADIO ACCESS METHOD, APPARATUS, AND SYSTEM FOR IMPLEMENTING MUTUAL TRANSMISSION AND PROCESSING OF COLLABORATIVE DATA BETWEEN SITES

(71) Applicant: Huawei Technologies Co., Ltd., Shenzhen (CN)

(72) Inventors: Xiaodong Zhang, Shanghai (CN); Jueping Wang, Shanghai (CN); Jianchun Wang, Shanghai (CN); Tao Pu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 15/042,837

(22) Filed: Feb. 12, 2016

(65) Prior Publication Data
US 2016/0173574 A1    Jun. 16, 2016

Related U.S. Application Data

(63) Continuation of application No. PCT/CN2013/081358, filed on Aug. 13, 2013.

(51) Int. Cl.
*H04L 29/08* (2006.01)
*H04B 7/024* (2017.01)
(Continued)

(52) U.S. Cl.
CPC ............ *H04L 67/10* (2013.01); *H04B 7/024* (2013.01); *H04W 84/042* (2013.01); *H04W 88/085* (2013.01)

(58) Field of Classification Search
CPC ... H04L 12/64; H04L 27/2649; H04L 27/265; H04L 27/2653; H04L 67/10;
(Continued)

(56) References Cited

U.S. PATENT DOCUMENTS

2007/0177552 A1    8/2007  Wu et al.
2012/0084361 A1    4/2012  De Foy et al.
(Continued)

FOREIGN PATENT DOCUMENTS

CN    101083606 A    12/2007
CN    101132632 A     2/2008
(Continued)

*Primary Examiner* — Peter Chen
(74) *Attorney, Agent, or Firm* — Leydig, Voit & Mayer, Ltd.

(57) ABSTRACT

Embodiments of the disclosure provide a radio access method, apparatus, and system, which can implement mutual transmission and processing of collaborative data between sites on a basis of low-cost deployment and high availability, and improve network performance. In the method, a basic DU is deployed in a site, and the method may include: receiving, by a switching device, a first data packet sent by a first basic DU; determining to send the first data packet to a second basic DU for collaborative processing; and sending the first data packet to the second basic DU, so that the second basic DU performs collaborative processing on the first data packet and a second data packet, where the second data packet and the first data packet are of a same data type. Embodiments of the disclosure are applicable to the communications field.

8 Claims, 21 Drawing Sheets

(51) Int. Cl.
*H04W 84/04* (2009.01)
*H04W 88/08* (2009.01)

(58) Field of Classification Search
CPC .......... H04L 67/1002; H04L 67/1095; H04W 84/042; H04W 84/045; H04W 84/047; H04B 7/02; H04B 7/022; H04B 7/024; H04B 7/026; H04B 7/14
See application file for complete search history.

(56) References Cited

U.S. PATENT DOCUMENTS

| | | | |
|---|---|---|---|
| 2012/0165055 A1 | 6/2012 | Lee et al. | |
| 2012/0176980 A1* | 7/2012 | Moon | H04W 72/1226 370/329 |
| 2013/0290466 A1* | 10/2013 | Lee | G06F 12/0802 709/213 |

| | | | | |
|---|---|---|---|---|
| 2014/0149549 A1 | | 5/2014 | Fu | |

FOREIGN PATENT DOCUMENTS

| | | | | |
|---|---|---|---|---|
| CN | 102131221 A | | 7/2011 | |
| CN | 102238592 A | | 11/2011 | |
| CN | 102281187 A | | 12/2011 | |
| CN | 102291455 A | * | 12/2011 | ......... H04L 12/4633 |
| CN | 102291455 A | | 12/2011 | |
| CN | 102340888 A | | 2/2012 | |
| CN | 102783099 A | | 11/2012 | |
| CN | 103139786 A | | 6/2013 | |
| EP | 2768196 A1 | | 8/2014 | |
| JP | 2007529926 A | | 10/2007 | |
| JP | 2012525745 A | | 10/2012 | |
| JP | 2012253530 A | | 12/2012 | |
| WO | 2010124726 A1 | | 11/2010 | |
| WO | 2012121114 A1 | | 9/2012 | |

* cited by examiner

RADIO ACCESS METHOD, APPARATUS, AND SYSTEM FOR IMPLEMENTING MUTUAL TRANSMISSION AND PROCESSING OF COLLABORATIVE DATA BETWEEN SITES

CROSS-REFERENCE TO RELATED APPLICATIONS

This application is a continuation of International Patent Application No. PCT/CN2013/081358, filed on Aug. 13, 2013, which is hereby incorporated by reference in its entirety.

TECHNICAL FIELD

Embodiments of the disclosure relate to the communications field, and in particular, to a radio access method, apparatus, and system.

BACKGROUND

With the development of radio communications technologies, radio access network architectures become diversified. At present, two existing radio access network architectures are provided:

1. Conventional radio access network architecture: In this architecture, a baseband is deployed in a site. Using long term evolution (Long Term Evolution, LTE) as an example, an access network uses an evolved universal terrestrial radio access network (Evolved Universal Terrestrial RAN, E-UTRAN) structure, where primarily a base station is connected to an access gateway by using an S1 interface, and base stations are connected to each other by using an X2 interface. This architecture has certain advantages in site deployment and is highly reliable; however, mutual transmission and processing of collaborative data between sites cannot be performed, and baseband consumption is high.

2. Centralized processing radio access network (Centralized Processing, Collaborative Radio, Real-Time Cloud Computing-Radio Access Network, C-RAN) architecture: This architecture puts a plurality of digital processing units (Cloud digital process units, Cloud DUs) together to implement centralized use of baseband processing resources. However, evolution from the conventional radio access network architecture to this structure causes a problem of a high deployment cost; moreover, because DUs are deployed in a centralized manner, disaster recovery cannot be implemented, resulting in poor availability of a site. In addition, after a DU is removed from a cabinet, it is possible that some devices that are originally controlled by the DU cannot work.

SUMMARY

In view of this, embodiments of the disclosure provide a radio access method, apparatus, and system, which can implement mutual transmission and processing of collaborative data between sites on a basis of low-cost deployment and high availability, and improve network performance.

In a first aspect, a radio access method is provided, where a basic digital processing unit DU in the method is deployed in a site, and the method includes:
receiving, by a switching device, a first data packet sent by a first basic DU;
determining to send the first data packet to a second basic DU for collaborative processing; and
sending the first data packet to the second basic DU, so that the second basic DU performs collaborative processing on the first data packet and a second data packet, where the second data packet and the first data packet are of a same data type.

In a first possible implementation manner of the first aspect, with reference to the first aspect, the method includes:
receiving a third data packet sent by a third basic DU;
determining to send the third data packet to a first extended DU for processing, where the first extended DU is deployed together with the switching device; and
sending the third data packet to the first extended DU, so that the first extended DU processes the third data packet.

In a second possible implementation manner of the first aspect, with reference to the first aspect or the first possible implementation manner of the first aspect, the method further includes:
receiving a fourth data packet sent by a fourth basic DU, and receiving a fifth data packet sent by a fifth basic DU, where the fourth data packet and the fifth data packet are of a same data type;
determining to send the fourth data packet and the fifth data packet to a second extended DU for collaborative processing, where the second extended DU is deployed together with the switching device; and
sending the fourth data packet and the fifth data packet to the second extended DU, so that the second extended DU performs collaborative processing on the fourth data packet and the fifth data packet.

In a third possible implementation manner of the first aspect, with reference to the first aspect, the first possible implementation manner of the first aspect, or the second possible implementation manner of the first aspect, the data type of the data packet includes:
L2 scheduling data, hard bit data, frequency-domain in-phase-quadrature IQ data, and time-domain IQ data.

In a second aspect, a radio access method is provided, where a basic digital processing unit DU in the method is deployed in a site, and the method includes:
receiving, by a switching device, a first data packet sent by a first basic DU, and receiving a second data packet sent by a second basic DU, where the first data packet and the second data packet are of a same data type;
determining to send the first data packet and the second data packet to a second extended DU for collaborative processing, where the second extended DU is deployed together with the switching device; and
sending the first data packet and the second data packet to the second extended DU, so that the second extended DU performs collaborative processing on the first data packet and the second data packet.

In a first possible implementation manner of the second aspect, with reference to the second aspect, the method further includes:
receiving a third data packet sent by a third basic DU;
determining to send the third data packet to a first extended DU for processing, where the first extended DU is deployed together with the switching device; and
sending the third data packet to the first extended DU, so that the first extended DU processes the third data packet.

In a second possible implementation manner of the second aspect, with reference to the second aspect or the first possible implementation manner of the second aspect, the data type of the data packet includes:
L2 scheduling data, hard bit data, frequency-domain in-phase-quadrature IQ data, and time-domain IQ data.

In a third aspect, a radio access method is provided, where a basic digital processing unit DU in the method is deployed in a site, and the method includes:

receiving, by a switching device, a first data packet sent by a first basic DU;

determining to send the first data packet to a second basic DU for collaborative processing;

sending the first data packet to the second basic DU, so that the second basic DU performs collaborative processing on the first data packet and a second data packet, where the second data packet and the first data packet are of a same data type;

receiving a first signal sent by the second basic DU; and sending the first signal.

In a first possible implementation manner of the third aspect, with reference to the third aspect, the method further includes:

receiving a third data packet sent by a third basic DU;

determining to send the third data packet to a first extended DU for processing, where the first extended DU is deployed together with the switching device;

sending the third data packet to the first extended DU, so that the first extended DU processes the third data packet;

receiving a second signal sent by the first extended DU; and sending the second signal.

In a second possible implementation manner of the third aspect, with reference to the third aspect or the first possible implementation manner of the third aspect, the method further includes:

receiving a fourth data packet sent by a fourth basic DU, and receiving a fifth data packet sent by a fifth basic DU, where the fourth data packet and the fifth data packet are of a same data type;

determining to send the fourth data packet and the fifth data packet to a second extended DU for collaborative processing, where the second extended DU is deployed together with the switching device;

sending the fourth data packet and the fifth data packet to the second extended DU, so that the second extended DU performs collaborative processing on the fourth data packet and the fifth data packet;

receiving a third signal sent by the second extended DU; and sending the third signal.

In a third possible implementation manner of the third aspect, with reference to the third aspect, the first possible implementation manner of the third aspect, or the second possible implementation manner of the third aspect, the data type of the data packet includes:

L2 scheduling data, hard bit data, frequency-domain in-phase-quadrature IQ data, and time-domain IQ data.

In a fourth aspect, a radio access method is provided, where a basic digital processing unit DU in the method is deployed in a site, and the method includes:

receiving, by a switching device, a first data packet sent by a first basic DU, and receiving a second data packet sent by a second basic DU, where the first data packet and the second data packet are of a same data type;

determining to send the first data packet and the second data packet to a second extended DU for collaborative processing, where the second extended DU is deployed together with the switching device;

sending the first data packet and the second data packet to the second extended DU, so that the second extended DU performs collaborative processing on the first data packet and the second data packet;

receiving a first signal sent by the second extended DU; and sending the first signal.

In a first possible implementation manner of the fourth aspect, with reference to the fourth aspect, the method further includes:

receiving a third data packet sent by a third basic DU;

determining to send the third data packet to a first extended DU for processing, where the first extended DU is deployed together with the switching device;

sending the third data packet to the first extended DU, so that the first extended DU processes the third data packet;

receiving a second signal sent by the first extended DU; and sending the second signal.

In a second possible implementation manner of the fourth aspect, with reference to the fourth aspect or the first possible implementation manner of the fourth aspect, the data type of the data packet includes:

L2 scheduling data, hard bit data, frequency-domain in-phase-quadrature IQ data, and time-domain IQ data.

In a fifth aspect, a switching device is provided, where the switching device includes a receiving unit, a determining unit, and a sending unit, where:

the receiving unit is configured to receive a first data packet sent by a first basic digital processing unit DU, and send the first data packet to the determining unit, where the basic DU is deployed in a site;

the determining unit is configured to receive the first data packet sent by the receiving unit, and after determining to send the first data packet to a second basic DU for collaborative processing, send the first data packet to the sending unit; and the sending unit is configured to receive the first data packet sent by the determining unit, and send the first data packet to the second basic DU, so that the second basic DU performs collaborative processing on the first data packet and a second data packet, where the second data packet and the first data packet are of a same data type.

In a first possible implementation manner of the fifth aspect, with reference to the fifth aspect, the receiving unit is further configured to receive a third data packet sent by a third basic DU, and send the third data packet to the determining unit;

the determining unit is further configured to receive the third data packet sent by the receiving unit, and after determining to send the third data packet to a first extended DU for processing, send the third data packet to the sending unit, where the first extended DU is deployed together with the switching device; and the sending unit is further configured to receive the third data packet sent by the receiving unit, and send the third data packet to the first extended DU, so that the first extended DU processes the third data packet.

In a second possible implementation manner of the fifth aspect, with reference to the fifth aspect or the first possible implementation manner of the fifth aspect, the receiving unit is further configured to receive a fourth data packet sent by a fourth basic DU and a fifth data packet sent by a fifth basic DU, and send the fourth data packet and the fifth data packet to the determining unit, where the fourth data packet and the fifth data packet are of a same data type;

the determining unit is further configured to receive the fourth data packet and the fifth data packet that are sent by the receiving unit, and after determining to send the fourth data packet and the fifth data packet to a second extended DU for collaborative processing, send the fourth data packet and the fifth data packet to the sending unit, where the second extended DU is deployed together with the switching device; and the sending unit is further configured to receive the fourth data packet and the fifth data packet that are sent by the determining unit, and send the fourth data packet and the fifth data packet to the second extended DU, so that the second extended DU performs collaborative processing on the fourth data packet and the fifth data packet.

In a third possible implementation manner of the fifth aspect, with reference to the fifth aspect, the first possible implementation manner of the fifth aspect, or the second possible implementation manner of the fifth aspect, the data type of the data packet includes:

L2 scheduling data, hard bit data, frequency-domain in-phase-quadrature IQ data, and time-domain IQ data.

In a sixth aspect, a switching device is provided, where the switching device includes a receiving unit, a determining unit, and a sending unit, where:

the receiving unit is configured to receive a first data packet sent by a first basic digital processing unit DU and a second data packet sent by a second basic DU, and send the first data packet and the second data packet to the determining unit, where the basic DUs are deployed in a site;

the determining unit is configured to receive the first data packet and the second data packet that are sent by the receiving unit, and after determining to send the first data packet and the second data packet to a second extended DU for collaborative processing, send the first data packet and the second data packet to the sending unit, where the second extended DU is deployed together with the switching device; and the sending unit is configured to receive the first data packet and the second data packet that are sent by the determining unit, and send the first data packet and the second data packet to the second extended DU, so that the second extended DU performs collaborative processing on the first data packet and the second data packet.

In a first possible implementation manner of the sixth aspect, with reference to the sixth aspect, the receiving unit is further configured to receive a third data packet sent by a third basic DU, and send the third data packet to the determining unit;

the determining unit is further configured to receive the third data packet sent by the receiving unit, and after determining to send the third data packet to a first extended DU for processing, send the third data packet to the sending unit, where the first extended DU is deployed together with the switching device; and the sending unit is further configured to receive the third data packet sent by the receiving unit, and send the third data packet to the first extended DU, so that the first extended DU processes the third data packet.

In a second possible implementation manner of the sixth aspect, with reference to the sixth aspect or the first possible implementation manner of the sixth aspect, the data type of the data packet includes:

L2 scheduling data, hard bit data, frequency-domain in-phase-quadrature IQ data, and time-domain IQ data.

In a seventh aspect, a switching device is provided, where the switching device includes a receiving unit, a determining unit, a first sending unit, and a second sending unit, where:

the receiving unit is configured to receive a first data packet sent by a first basic digital processing unit DU, and send the first data packet to the determining unit, where the basic DU is deployed in a site;

the determining unit is configured to receive the first data packet sent by the receiving unit, and after determining to send the first data packet to a second basic DU for collaborative processing, send the first data packet to the first sending unit;

the first sending unit is configured to receive the first data packet sent by the determining unit, and send the first data packet to the second basic DU, so that the second basic DU performs collaborative processing on the first data packet and a second data packet, where the second data packet and the first data packet are of a same data type;

the receiving unit is further configured to receive a first signal sent by the second basic DU, and send the first signal to the second sending unit; and the second sending unit is configured to receive the first signal sent by the receiving unit, and send the first signal.

In a first possible implementation manner of the seventh aspect, with reference to the seventh aspect, the receiving unit is further configured to receive a third data packet sent by a third basic DU, and send the third data packet to the determining unit;

the determining unit is configured to receive the third data packet sent by the receiving unit, and after determining to send the third data packet to a first extended DU for processing, send the third data packet to the first sending unit, where the first extended DU is deployed together with the switching device;

the first sending unit is further configured to receive the third data packet sent by the determining unit, and send the third data packet to the first extended DU, so that the first extended DU processes the third data packet;

the receiving unit is further configured to receive a second signal sent by the first extended DU, and send the second signal to the second sending unit; and the second sending unit is configured to receive the second signal sent by the receiving unit, and send the second signal.

In a second possible implementation manner of the seventh aspect, with reference to the seventh aspect or the first possible implementation manner of the seventh aspect, the receiving unit is further configured to receive a fourth data packet sent by a fourth basic DU and a fifth data packet sent by a fifth basic DU, and send the fourth data packet and the fifth data packet to the determining unit, where the fourth data packet and the fifth data packet are of a same data type;

the determining unit is further configured to receive the fourth data packet and the fifth data packet that are sent by the receiving unit, and after determining to send the fourth data packet and the fifth data packet to a second extended DU for collaborative processing, send the fourth data packet and the fifth data packet to the first sending unit, where the second extended DU is deployed together with the switching device;

the first sending unit is further configured to receive the fourth data packet and the fifth data packet that are sent by the determining unit, and send the fourth data packet and the fifth data packet to the second extended DU, so that the second extended DU performs collaborative processing on the fourth data packet and the fifth data packet;

the receiving unit is further configured to receive a third signal sent by the second extended DU, and send the third signal to the second sending unit; and the second sending unit is configured to receive the third signal sent by the receiving unit, and send the third signal.

In a third possible implementation manner of the seventh aspect, with reference to the seventh aspect, the first possible implementation manner of the seventh aspect, or the second possible implementation manner of the seventh aspect, the data type of the data packet includes:

L2 scheduling data, hard bit data, frequency-domain in-phase-quadrature IQ data, and time-domain IQ data.

In an eighth aspect, a switching device is provided, where the switching device includes a receiving unit, a determining unit, a first sending unit, and a second sending unit, where:

the receiving unit is configured to receive a first data packet sent by a first basic digital processing unit DU and a second data packet sent by a second basic DU, and send the first data packet and the second data packet to the determining unit, where the basic DUs are deployed in a site;

the determining unit is configured to receive the first data packet and the second data packet that are sent by the receiving unit, and after determining to send the first data packet and the second data packet to a second extended DU for collaborative processing, send the first data packet and the second data packet to the first sending unit, where the second extended DU is deployed together with the switching device;

the first sending unit is configured to receive the first data packet and the second data packet that are sent by the determining unit, and send the first data packet and the second data packet to the second extended DU, so that the second extended DU performs collaborative processing on the first data packet and the second data packet;

the receiving unit is further configured to receive a first signal sent by the second extended DU, and send the first signal to the second sending unit; and the second sending unit is configured to receive the first signal sent by the receiving unit, and send the first signal.

In a first possible implementation manner of the eighth aspect, with reference to the eighth aspect, the receiving unit is further configured to receive a third data packet sent by a third basic DU, and send the third data packet to the determining unit;

the determining unit is further configured to receive the third data packet sent by the receiving unit, and after determining to send the third data packet to a first extended DU for processing, send the third data packet to the first sending unit, where the first extended DU is deployed together with the switching device;

the first sending unit is further configured to receive the third data packet sent by the receiving unit, and send the third data packet to the first extended DU, so that the first extended DU processes the third data packet;

the receiving unit is further configured to receive a second signal sent by the first extended DU, and send the second signal to the second sending unit; and the second sending unit is configured to receive the second signal sent by the receiving unit, and send the second signal.

In a second possible implementation manner of the eighth aspect, with reference to the eighth aspect or the first possible implementation manner of the eighth aspect, the data type of the data packet includes:

L2 scheduling data, hard bit data, frequency-domain in-phase-quadrature IQ data, and time-domain IQ data.

In a ninth aspect, a switching device is provided, where the switching device includes a receiver, a processor, and a transmitter, where:

the receiver is configured to receive a first data packet sent by a first basic digital processing unit DU, and send the first data packet to the processor, where the basic DU is deployed in a site;

the processor is configured to receive the first data packet sent by the receiver, and after determining to send the first data packet to a second basic DU for collaborative processing, send the first data packet to the transmitter; and the transmitter is configured to receive the first data packet sent by the processor, and send the first data packet to the second basic DU, so that the second basic DU performs collaborative processing on the first data packet and a second data packet, where the second data packet and the first data packet are of a same data type.

In a first possible implementation manner of the ninth aspect, with reference to the ninth aspect, the receiver is further configured to receive a third data packet sent by a third basic DU, and send the third data packet to the processor;

the processor is further configured to receive the third data packet sent by the receiver, and after determining to send the third data packet to a first extended DU for processing, send the third data packet to the transmitter, where the first extended DU is deployed together with the switching device; and the transmitter is further configured to receive the third data packet sent by the receiver, and send the third data packet to the first extended DU, so that the first extended DU processes the third data packet.

In a second possible implementation manner of the ninth aspect, with reference to the ninth aspect or the first possible implementation manner of the ninth aspect, the receiver is further configured to receive a fourth data packet sent by a fourth basic DU and a fifth data packet sent by a fifth basic DU, and send the fourth data packet and the fifth data packet to the processor, where the fourth data packet and the fifth data packet are of a same data type;

the processor is further configured to receive the fourth data packet and the fifth data packet that are sent by the receiver, and after determining to send the fourth data packet and the fifth data packet to a second extended DU for collaborative processing, send the fourth data packet and the fifth data packet to the transmitter, where the second extended DU is deployed together with the switching device; and the transmitter is further configured to receive the fourth data packet and the fifth data packet that are sent by the processor, and send the fourth data packet and the fifth data packet to the second extended DU, so that the second extended DU performs collaborative processing on the fourth data packet and the fifth data packet.

In a third possible implementation manner of the ninth aspect, with reference to the ninth aspect, the first possible implementation manner of the ninth aspect, or the second possible implementation manner of the ninth aspect, the data type of the data packet includes:

L2 scheduling data, hard bit data, frequency-domain in-phase-quadrature IQ data, and time-domain IQ data.

In a tenth aspect, a switching device is provided, where the switching device includes a receiver, a processor, and a transmitter, where:

the receiver is configured to receive a first data packet sent by a first basic digital processing unit DU and a second data packet sent by a second basic DU, and send the first data packet and the second data packet to the processor, where the basic DUs are deployed in a site;

the processor is configured to receive the first data packet and the second data packet that are sent by the receiver, and after determining to send the first data packet and the second data packet to a second extended DU for collaborative processing, send the first data packet and the second data packet to the transmitter, where the second extended DU is deployed together with the switching device; and the transmitter is configured to receive the first data packet and the second data packet that are sent by the processor, and send the first data packet and the second data packet to the second extended DU, so that the second extended DU performs collaborative processing on the first data packet and the second data packet.

In a first possible implementation manner of the tenth aspect, with reference to the tenth aspect, the receiver is further configured to receive a third data packet sent by a third basic DU, and send the third data packet to the processor;

the processor is further configured to receive the third data packet sent by the receiver, and after determining to send the third data packet to a first extended DU for processing, send the third data packet to the transmitter, where the first extended DU is deployed together with the switching device; and the transmitter is further configured to receive the third data packet sent by the receiver, and send the third data packet to the first extended DU, so that the first extended DU processes the third data packet.

In a second possible implementation manner of the tenth aspect, with reference to the tenth aspect or the first possible implementation manner of the tenth aspect, the data type of the data packet includes:

L2 scheduling data, hard bit data, frequency-domain in-phase-quadrature IQ data, and time-domain IQ data.

In an eleventh aspect, a switching device is provided, where the switching device includes a receiver, a processor, a first transmitter, and a second transmitter, where:

the receiver is configured to receive a first data packet sent by a first basic digital processing unit DU, and send the first data packet to the processor, where the basic DU is deployed in a site;

the processor is configured to receive the first data packet sent by the receiver, and after determining to send the first data packet to a second basic DU for collaborative processing, send the first data packet to the first transmitter;

the first transmitter is configured to receive the first data packet sent by the processor, and send the first data packet to the second basic DU, so that the second basic DU performs collaborative processing on the first data packet and a second data packet, where the second data packet and the first data packet are of a same data type;

the receiver is further configured to receive a first signal sent by the second basic DU, and send the first signal to the second transmitter; and the second transmitter is configured to receive the first signal sent by the receiver, and send the first signal.

In a first possible implementation manner of the eleventh aspect, with reference to the eleventh aspect, the receiver is further configured to receive a third data packet sent by a third basic DU, and send the third data packet to the processor;

the processor is configured to receive the third data packet sent by the receiver, and after determining to send the third data packet to a first extended DU for processing, send the third data packet to the first transmitter, where the first extended DU is deployed together with the switching device;

the first transmitter is further configured to receive the third data packet sent by the processor, and send the third data packet to the first extended DU, so that the first extended DU processes the third data packet;

the receiver is further configured to receive a second signal sent by the first extended DU, and send the second signal to the second transmitter; and the second transmitter is configured to receive the second signal sent by the receiver, and send the second signal.

In a second possible implementation manner of the eleventh aspect, with reference to the eleventh aspect or the first possible implementation manner of the eleventh aspect, the receiver is further configured to receive a fourth data packet sent by a fourth basic DU and a fifth data packet sent by a fifth basic DU, and send the fourth data packet and the fifth data packet to the processor, where the fourth data packet and the fifth data packet are of a same data type;

the processor is further configured to receive the fourth data packet and the fifth data packet that are sent by the receiver, and after determining to send the fourth data packet and the fifth data packet to a second extended DU for collaborative processing, send the fourth data packet and the fifth data packet to the first transmitter, where the second extended DU is deployed together with the switching device;

the first transmitter is further configured to receive the fourth data packet and the fifth data packet that are sent by the processor, and send the fourth data packet and the fifth data packet to the second extended DU, so that the second extended DU performs collaborative processing on the fourth data packet and the fifth data packet;

the receiver is further configured to receive a third signal sent by the second extended DU, and send the third signal to the second transmitter; and the second transmitter is configured to receive the third signal sent by the receiver, and send the third signal.

In a third possible implementation manner of the eleventh aspect, with reference to the eleventh aspect, the first possible implementation manner of the eleventh aspect, or the second possible implementation manner of the eleventh aspect, the data type of the data packet includes:

L2 scheduling data, hard bit data, frequency-domain in-phase-quadrature IQ data, and time-domain IQ data.

In a twelfth aspect, a switching device is provided, where the switching device includes a receiver, a processor, a first transmitter, and a second transmitter, where:

the receiver is configured to receive a first data packet sent by a first basic digital processing unit DU and a second data packet sent by a second basic DU, and send the first data packet and the second data packet to the processor, where the basic DUs are deployed in a site;

the processor is configured to receive the first data packet and the second data packet that are sent by the receiver, and after determining to send the first data packet and the second data packet to a second extended DU for collaborative processing, send the first data packet and the second data packet to the first transmitter, where the second extended DU is deployed together with the switching device;

the first transmitter is configured to receive the first data packet and the second data packet that are sent by the processor, and send the first data packet and the second data packet to the second extended DU, so that the second extended DU performs collaborative processing on the first data packet and the second data packet;

the receiver is further configured to receive a first signal sent by the second extended DU, and send the first signal to the second transmitter; and the second transmitter is configured to receive the first signal sent by the receiver, and send the first signal.

In a first possible implementation manner of the twelfth aspect, with reference to the twelfth aspect, the receiver is further configured to receive a third data packet sent by a third basic DU, and send the third data packet to the processor;

the processor is further configured to receive the third data packet sent by the receiver, and after determining to send the third data packet to a first extended DU for processing, send the third data packet to the first transmitter, where the first extended DU is deployed together with the switching device;

the first transmitter is further configured to receive the third data packet sent by the receiver, and send the third data packet to the first extended DU, so that the first extended DU processes the third data packet;

the receiver is further configured to receive a second signal sent by the first extended DU, and send the second signal to the second transmitter; and the second transmitter is configured to receive the second signal sent by the receiver, and send the second signal.

In a second possible implementation manner of the twelfth aspect, with reference to the twelfth aspect or the first possible implementation manner of the twelfth aspect, the data type of the data packet includes:

L2 scheduling data, hard bit data, frequency-domain in-phase-quadrature IQ data, and time-domain IQ data.

In a thirteenth aspect, a digital processing unit DU is provided, where the DU is classified into a basic DU and an extended DU, the basic DU is a DU deployed in a site, and the extended DU is a DU deployed together with a switching device, and the DU includes:

an L1 processing module, an L2 processing module, an L3 processing module, a first interface, and a second interface, where:

the L1 processing module is connected to a radio frequency processing unit RU and the L2 processing module separately, the L2 processing module is connected to the L3 processing module, the L3 processing module is connected to the first interface, the L1 processing module is further connected to the second interface, the L2 processing module is further connected to the second interface, and the second interface is further connected to the RU;

the first interface is configured to receive and send a signal; and the second interface is configured to receive and send a data packet.

In a first possible implementation manner of the thirteenth aspect, with reference to the thirteenth aspect, the L1 processing module includes at least one L1 processing submodule, and the L2 processing module includes at least one L2 processing submodule;

the L1 processing module being connected to the second interface specifically includes:

each L1 processing submodule of the at least one L1 processing submodule being connected to the second interface separately; and the L2 processing module being connected to the second interface specifically includes:

each L2 processing submodule of the at least one L2 processing submodule being connected to the second interface separately.

In a fourteenth aspect, a radio access system is provided, where the system includes:

a radio frequency processing unit RU, the basic DU according to any one of the thirteenth aspect, a transmission network, and the switching device according to the fifth aspect, where:

a second interface of the basic DU is connected to the switching device, and the basic DU interacts with the switching device by using the transmission network.

In a first possible implementation manner of the fourteenth aspect, the switching device includes n-stage switches, where n≥2; and a first distance exists between a first-stage switch of the n-stage switches and the basic DU, and a second distance exists between an $n^{th}$-stage switch of the n-stage switches and the basic DU, where the first distance is smaller than the second distance.

In a fifteenth aspect, a radio access system is provided, where the system includes:

a radio frequency processing unit RU, the basic DU according to any one of the thirteenth aspect, the extended DU according to any one of the thirteenth aspect, a transmission network, and the switching device according to the first possible implementation manner of the fifth aspect to the third possible implementation manner of the fifth aspect or the switching device according to the sixth aspect, where:

a second interface of the basic DU is connected to the switching device, a second interface of the extended DU is connected to the switching device, and the basic DU and the extended DU interact with the switching device by using the transmission network.

In a first possible implementation manner of the fifteenth aspect, with reference to the fifteenth aspect, the switching device includes n-stage switching units, where n≥2; and a first distance exists between a first-stage switching unit of the n-stage switching units and the basic DU, and a second distance exists between an $n^{th}$-stage switching unit of the n-stage switching units and the basic DU, where the first distance is smaller than the second distance.

In a sixteenth aspect, a radio access system is provided, where the system includes:

a radio frequency processing unit RU, the basic DU according to any one of the thirteenth aspect, a transmission network, and the switching device according to the seventh aspect, where:

a first interface and a second interface of the basic DU are both connected to the switching device, and the basic DU interacts with the switching device by using the transmission network.

In a first possible implementation manner of the sixteenth aspect, with reference to the sixteenth aspect, the switching device includes n-stage switching units, where n≥2; and a first distance exists between a first-stage switching unit of the n-stage switching units and the basic DU, and a second distance exists between an $n^{th}$-stage switching unit of the n-stage switching units and the basic DU, where the first distance is smaller than the second distance.

In a seventeenth aspect, a radio access system is provided, where the system includes:

a radio frequency processing unit RU, the basic DU according to any one of the thirteenth aspect, the extended DU according to any one of the thirteenth aspect, a transmission network, and the switching device according to the first possible implementation manner of the seventh aspect to the third possible implementation manner of the seventh aspect or the switching device according to the eighth aspect, where:

a first interface and a second interface of the basic DU are both connected to the switching device, a first interface and a second interface of the extended DU are both connected to the switching device, and the basic DU and the extended DU interact with the switching device by using the transmission network.

In a first possible implementation manner of the seventeenth aspect, with reference to the seventeenth aspect, the switching device includes n-stage switching units, where n≥2; and a first distance exists between a first-stage switching unit of the n-stage switching units and the basic DU, and a second distance exists between an $n^{th}$-stage switching unit of the n-stage switching units and the basic DU, where the first distance is smaller than the second distance.

According to the foregoing solutions, relative to positions of DUs in the conventional radio access network architecture, positions of basic DUs in the solutions are not changed, where the basic DUs are still deployed in a site, or a change is merely adding extended DUs; therefore, a deployment cost is lower than that of the conventional C-RAN architecture. Moreover, relative to the positions of the DUs in the C-RAN access network architecture, the positions of the basic DUs in the foregoing solutions are arranged in a distributed manner; therefore, disaster recovery may be implemented, so that the network architecture has high availability. In addition, the solutions may be used to implement baseband collaborative processing in the basic DUs, which improves network performance; and a first extended DU may be used to act as a baseband resource pool of a basic DU, which improves high availability of a system; and further, baseband collaborative processing may be performed in a second extended DU, which may not only further improve the network performance, but also further improve the high availability of the system.

BRIEF DESCRIPTION OF DRAWINGS

To describe the technical solutions in the embodiments of the disclosure or in the prior art more clearly, the following briefly introduces the accompanying drawings required for describing the embodiments or the prior art. Apparently, the accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and completely describes the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art based on the embodiments of the disclosure without creative efforts shall fall within the protection scope of the present application.

Embodiment 1

This embodiment of the disclosure provides a radio access method, where the method is applied to a switching device.

Figure 1:
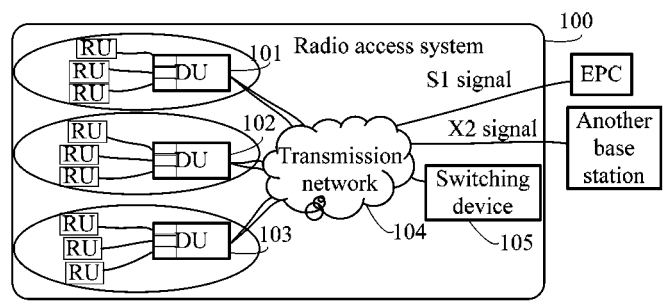
FIG. 1 is a radio access system according to an embodiment of the disclosure.
Figure 2:
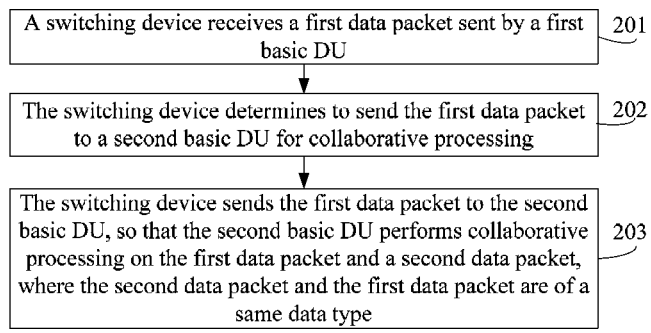
FIG. 2 is a radio access method according to an embodiment of the disclosure.

In the method, a basic digital outputting unit DU is deployed in a site; and the method is specifically described on a basis of a radio access system 100 that is corresponding to an LTE network and shown in FIG. 1. It is assumed that the radio access system 100 shown in FIG. 1 includes three basic DUs, which are a DU 101, a DU 102, and a DU 103; and the system 100 further includes radio frequency processing units (Radio process unit, RU), a transmission network 104, and a switching device 105. Accordingly, as shown in FIG. 2, the method includes:

201. A switching device receives a first data packet sent by a first basic DU.

This embodiment of the disclosure does not specifically limit the number of the first basic DUs, where there may be one or more first basic DUs, and all basic DUs having a technical feature of the first basic DU in this embodiment of the disclosure may be referred to as first basic DUs.

For example, in FIG. 1, the first basic DU may be the DU 101, the DU 102, or the DU 101 and the DU 102.

It should be noted that "first" in the first data packet does not have any special meaning, and is merely used to differentiate from a "second" data packet in this embodiment of the disclosure to indicate a data packet of a different baseband. Certainly, there may be one or more first/second data packets. That is, the first data packet may be a data packet of one RU corresponding to the first basic DU, a data packet of a plurality of RUs corresponding to the first basic DU, or a plurality of data packets formed by replicating a data packet of one RU corresponding to the first basic DU, which is not specifically limited in this embodiment of the disclosure.

For example, in the radio access system 100 shown in FIG. 1, a terminal user 1 near the DU 101 makes a phone call on a mobile phone; and a signal of the mobile phone may be received by an antenna near the DU 101, an antenna near the DU 102, and an antenna near the DU 103. Accordingly, the DU 101 may replicate a data packet according to a requirement to send the data packet to the switching device for collaborative processing in the DU 102 or the DU 103.

Similarly, for each data packet involved in the following methods in the present application, there may be one or more such data packets. This is not repeated in the following embodiments.

202. The switching device determines to send the first data packet to a second basic DU for collaborative processing.

This embodiment of the disclosure does not specifically limit the number of the second basic DUs either, where there may be one or more second basic DUs, and all basic DUs having a technical feature of the second basic DU in this embodiment of the disclosure may be referred to as second basic DUs.

For example, in FIG. 1, the second basic DU may be the DU 101, the DU 102, or the DU 103.

Specifically, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

For example, in FIG. 1, if a data routing policy specifies that the DU 101 does not perform baseband processing, and collaborative processing is to be performed on a baseband requiring processing in the DU 101 and a baseband requiring processing in the DU 102, the switching device determines, according to this data routing policy, to send a first data packet sent by the DU 101 to the DU 102 for collaborative processing. In this case, the DU 101 is the first basic DU, and the DU 102 is the second basic DU.

203. The switching device sends the first data packet to the second basic DU, so that the second basic DU performs collaborative processing on the first data packet and a second data packet, where the second data packet and the first data packet are of a same data type.

For example, in FIG. 1, if the switching device determines to send a first data packet sent by the DU 101 to the DU 102 for collaborative processing, the switching device sends the first data packet to the DU 102, so that the DU 102 performs collaborative processing on the first data packet and the second data packet.

The second data packet may be a data packet of a baseband of the second basic DU, or a data packet of another baseband that requires collaborative processing in the second basic DU, which is not specifically limited in this embodiment of the disclosure. This embodiment merely describes that the first data packet and the second data packet are of the same data type.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 1, if the DU 101 is the first basic DU, the DU 102 is the second basic DU, and the first data packet is a data packet sent by an L2 processing submodule of the DU 101 to the switching device, the second data packet should be a data packet output by an L2 processing submodule of the DU 102.

The data type of the data packet may include:

L2 scheduling data, hard bit data, frequency-domain in-phase-quadrature (in-phase-quadrature, IQ) data, and time-domain IQ data.

Based on the description of the foregoing embodiment, relative to positions of DUs in the conventional radio access network architecture, positions of basic DUs in the method are not changed, where the basic DUs are still deployed in a site; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, by using a solution in which a switching device receives a first data packet sent by a first basic DU, and after determining to send the first data packet to a second basic DU for collaborative processing, sends the first data packet to the second basic DU, so that the second basic DU performs collaborative processing on the first data packet and a second data packet, the method may implement mutual transmission and processing of collaborative data between sites, which may improve network performance.

This embodiment of the disclosure further provides a radio access method, where the method is applied to a switching device. In the method, a basic DU is deployed in a site; and the method is specifically described on a basis of a radio access system 300 that is corresponding to an LTE network and shown in FIG. 3. It is assumed that the radio access system 300 shown in FIG. 3 includes five basic DUs, which are a DU 301, a DU 302, a DU 303, a DU 304, and a DU 305; and the system 300 further includes RUs, a transmission network 306, a switching device 307, and two extended DUs, which are an extended DU 308 and an extended DU 309, where the extended DUs are deployed together with the switching device. As shown in FIG. 4, the method includes:

401. A switching device receives a first data packet sent by a first basic DU, and receives a second data packet sent by a second basic DU, where the first data packet and the second data packet are of a same data type.

This embodiment of the disclosure does not specifically limit the number of the first basic DUs or the second basic DUs, where there may be one or more first basic DUs or second basic DUs. The first basic DU and the second basic DU have a same technical feature; and one of any two basic DUs having the technical feature may be referred to as a first basic DU, and the other one is referred to as a second basic DU.

Figure 3:
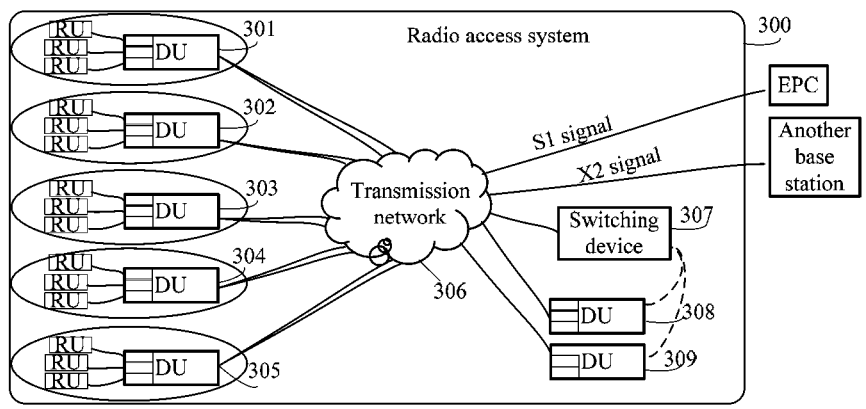
FIG. 3 is a radio access system according to an embodiment of the disclosure.
Figure 4:
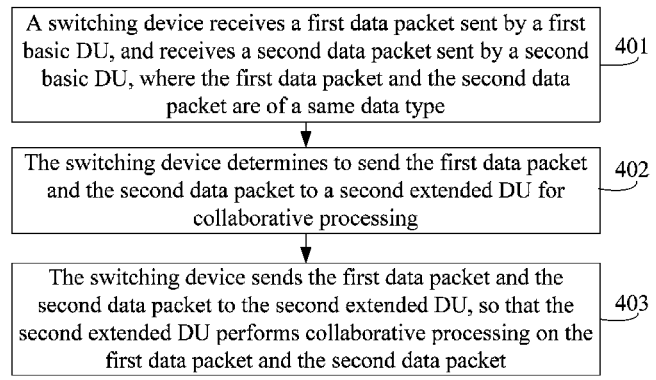
FIG. 4 is a radio access method according to an embodiment of the disclosure.

For example, in FIG. 3, the first basic DU may be the DU 301, and the second basic DU may be the DU 302. Certainly, if the DU 303 also has the technical feature of the DU 302 or the DU 301, the DU 303 may be referred to as a second basic DU relative to the DU 301, or the DU 303 may be referred to as a first basic DU relative to the DU 302.

Similarly, if the DU 304 also has the technical feature of the DU 301 or the DU 302, the DU 304 may be referred to as a second basic DU relative to the DU 301, or the DU 304 may be referred to as a first basic DU relative to the DU 302.

Therefore, by analogy, the first basic DU may be one or more DUs, or the second basic DU may be one or more DUs, which is not specifically limited in this embodiment of the disclosure.

It should be noted that "first" in the first data packet does not have any special meaning, and is merely used to differentiate from a "second" data packet in this embodiment of the disclosure to indicate a data packet of a different baseband.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 3, if the DU 301 is the first basic DU, the DU 302 is the second basic DU, and the first data packet is a data packet sent by an L2 processing submodule of the DU 301 to the switching device, the second data packet should be a data packet sent by an L2 processing submodule of the DU 302 to the switching device.

The data type of the data packet may include:

L2 scheduling data, hard bit data, frequency-domain IQ data, and time-domain IQ data.

402. The switching device determines to send the first data packet and the second data packet to a second extended DU for collaborative processing.

Specifically, in some application scenarios, it is possible that a collaborative algorithm cannot be deployed because hardware of a basic DU is limited; therefore, the switching device may determine, according to a data routing policy, a bandwidth requirement of a transmission network, and a baseband processing capability of a DU, to send the first data packet and the second data packet to the second extended DU for collaborative processing, which is not specifically limited in this embodiment of the disclosure.

For example, in FIG. 3, if a data routing policy specifies that neither the DU 301 nor the DU 302 performs baseband processing, and the extended DU 308 performs collaborative processing on a baseband requiring processing in the DU 301 and a baseband requiring processing in the DU 302, the switching device determines, according to this data routing policy, to send a first data packet sent by the DU 301 and a second data packet sent by the DU 302 to the DU 308 for collaborative processing.

403. The switching device sends the first data packet and the second data packet to the second extended DU, so that the second extended DU performs collaborative processing on the first data packet and the second data packet.

For example, in FIG. 3, if the switching device determines to send a first data packet sent by the DU 301 and a second data packet sent by the DU 302 to the DU 308 for collaborative processing, the switching device sends the first data packet and the second data packet to the DU 308, so that the DU 308 performs collaborative processing on the first data packet and the second data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be deemed as second extended DUs.

Based on the description of the foregoing embodiment, relative to positions of DUs in the conventional radio access network architecture, positions of basic DUs in the method are not changed, where the basic DUs are still deployed in a site, and only extended DUs are added to perform baseband collaborative processing in the extended DUs; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, by using a solution in which a switching device receives a first data packet sent by a first basic DU and a second data packet sent by a second basic DU, and after determining to send the first data packet and the second data packet to a second extended DU for collaborative processing, sends the first data packet and the second data packet to the second extended DU, so that the second extended DU performs collaborative processing on the first data packet and the second data packet, the method may implement mutual transmission and processing of collaborative data between sites, which further improves network performance.

This embodiment of the disclosure further provides a radio access method, where the method is applied to a switching device. In the method, a basic DU is deployed in a site; and the method is specifically described on a basis of a radio access system 500 that is corresponding to an LTE network and shown in FIG. 5. It is assumed that the radio access system 500 shown in FIG. 5 includes three basic DUs, which are a DU 501, a DU 502, and a DU 503; and the system 500 further includes RUs, an access network 504, and a switching device 505. Accordingly, as shown in FIG. 6, the method includes:

601. A switching device receives a first data packet sent by a first basic DU.

This embodiment of the disclosure does not specifically limit the number of the first basic DUs, where there may be one or more first basic DUs, and all basic DUs having a technical feature of the first basic DU in this embodiment of the disclosure may be referred to as first basic DUs.

Figure 5:
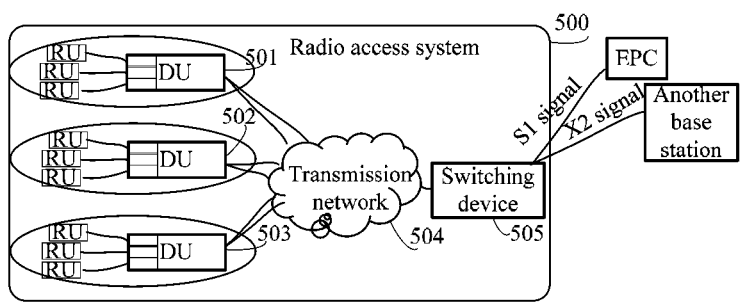
FIG. 5 is a radio access system according to an embodiment of the disclosure.
Figure 6:
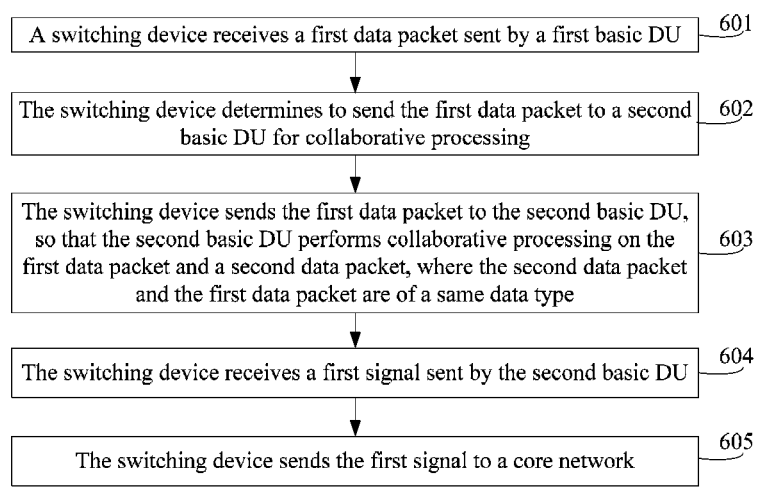
FIG. 6 is a radio access method according to an embodiment of the disclosure.

For example, in FIG. 5, the first basic DU may be the DU 501, the DU 502, or the DU 501 and the DU 502.

It should be noted that "first" in the first data packet does not have any special meaning, and is merely used to differentiate from a "second" data packet, a "third" data packet, a "fourth" data packet, and a "fifth" data packet in the following to indicate a data packet of a different baseband.

602. The switching device determines to send the first data packet to a second basic DU for collaborative processing.

This embodiment of the disclosure does not specifically limit the number of the second basic DUs either, where there may be one or more second basic DUs, and all basic DUs having a technical feature of the second basic DU in this embodiment of the disclosure may be referred to as second basic DUs.

For example, in FIG. 5, the second basic DU may be the DU 501, the DU 502, or the DU 503.

Specifically, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

For example, in FIG. 5, if a data routing policy specifies that the DU 501 does not perform baseband processing, and collaborative processing is to be performed on a baseband requiring processing in the DU 501 and a baseband requiring processing in the DU 502, the switching device determines, according to this data routing policy, to send a first data packet sent by the DU 501 to the DU 502 for collaborative processing. In this case, the DU 501 is the first basic DU, and the DU 502 is the second basic DU.

603. The switching device sends the first data packet to the second basic DU, so that the second basic DU performs collaborative processing on the first data packet and a second data packet, where the second data packet and the first data packet are of a same data type.

For example, in FIG. 5, if the switching device determines to send a first data packet sent by the DU 501 to the DU 502 for collaborative processing, the switching device sends the first data packet to the DU 502, so that the DU 502 performs collaborative processing on the first data packet and a second data packet.

Specifically, the second data packet may be a data packet of a baseband of the second basic DU, or may include a data packet of another baseband that requires collaborative processing in the second basic DU, which is not specifically limited in this embodiment of the disclosure. This embodiment merely describes that the first data packet and the second data packet are of the same data type.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 5, if the DU 501 is the first basic DU, the DU 502 is the second basic DU, and the first data packet is a data packet sent by an L2 processing submodule of the DU 501 to the switching device, the second data packet should be a data packet output by an L2 processing submodule of the DU 502.

The data type of the data packet may include:
L2 scheduling data, hard bit data, frequency-domain IQ data, and time-domain IQ data.

604. The switching device receives a first signal sent by the second basic DU.

Specifically, the radio access system 500 shown in FIG. 5 is different from the radio access system 100 shown in FIG. 1, where a signal in the system 100 is directly sent to a core network by using a transmission network, but a signal in the system 500 is sent to the switching device by using a transmission network, and then sent by the switching device to a core network; therefore, relative to the radio access method shown in FIG. 2, in the radio access method provided in this embodiment, the switching device, after sending the first data packet to the second basic DU so that the second basic DU performs collaborative processing on the first data packet and the second data packet, further receives the first signal sent by the second basic DU.

It should be noted that "first" in the first signal does not have any special meaning, and is merely used to differentiate from a "second" signal and a "third" signal in the following.

A person skilled in the art may understand that, a basis that this embodiment of the disclosure is practicable is established on a basis that a DU has two logical input/output interfaces, where one interface is used to output a signal, and the other interface is used to receive and send a data packet. A schematic apparatus structural diagram of a DU is provided in this embodiment. Specifically, as shown in FIG. 7, the DU 700 includes an L1 processing module 701, an L2 processing module 702, an L3 processing module 703, a first interface 704, and a second interface 705.

The L1 processing module 701 is connected to a radio frequency processing unit (Radio Process Unit, RU) and the L2 processing module 702 separately, the L2 processing module 702 is connected to the L3 processing module 703, the L3 processing module 703 is connected to the first output interface 704, the L1 processing module is further connected to the second interface 705, the L2 processing module 702 is further connected to the second interface 705, and the second interface 705 is further connected to the RU; the first interface 704 is configured to receive and send a signal; and the second interface 705 is configured to receive and send a data packet.

It should be noted that, for ease of describing baseband processing according to the present application, an interior schematic structural diagram of the DU involved in the present disclosure only exemplarily gives a baseband processing module, which includes the L1 processing module 701, the L2 processing module 702, and the L3 processing module 703. Certainly, in addition to the baseband processing modules, the DU may further include another processing module, for example, a clock processing module or a transmission processing module, which is not limited in this embodiment of the disclosure. The transmission processing module is configured to perform transmission processing, for example, to perform network protocol security (InternetPrococolSecurity, IPSEC) processing. The module may be included in the first interface and the second interface, or be connected to the first interface and the second interface, which is not limited in this embodiment of the disclosure either.

Figure 7:
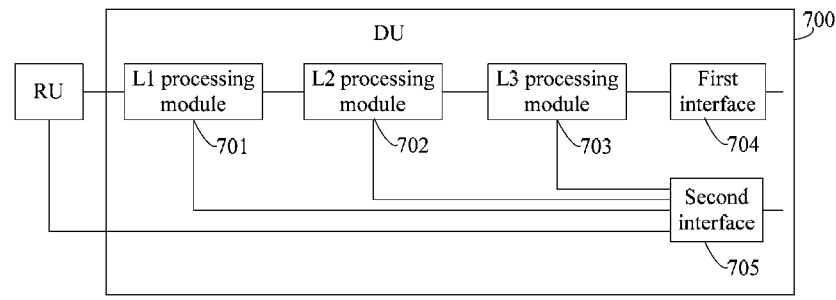
FIG. 7 is a schematic apparatus diagram of a DU according to an embodiment of the disclosure.
Figure 8:
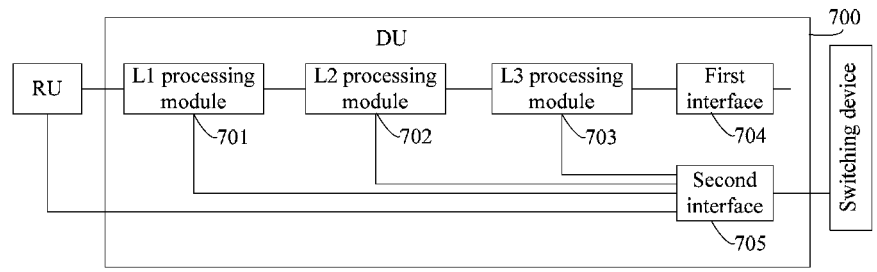
FIG. 8 is a schematic diagram of a connection relationship between a DU and a switching device according to an embodiment of the disclosure.
Figure 9:
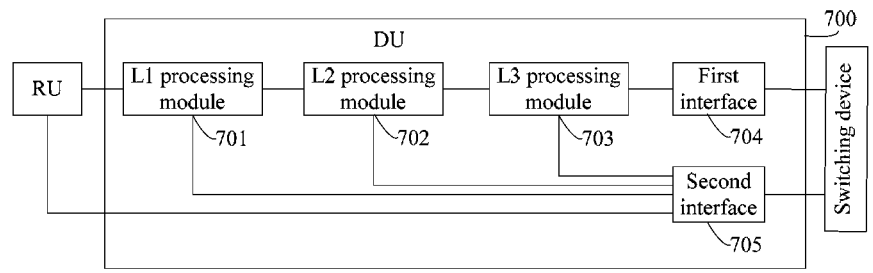
FIG. 9 is a schematic diagram of another connection relationship between a DU and a switching device according to an embodiment of the disclosure.

Apparently, if the DU in the radio access system 100 shown in FIG. 1 is the DU in FIG. 7, a diagram of a connection between the DU and the switching device through the transmission network is shown in FIG. 8, where only a second interface of the DU is connected to the switching device; and if the DU in the radio access system shown in FIG. 5 is the DU shown in FIG. 7, a diagram of a connection between the DU and the switching device through the transmission network is shown in FIG. 9, where a first interface and a second interface of the DU are both connected to the switching device.

It should be noted that the first interface and the second interface are merely logical interfaces, which may correspond to one physical interface, or may correspond to two physical interfaces. The diagram merely exemplarily shows a connection relationship between the interface and the switching device. For example, for the connection relationship between the DU and the switching device shown in FIG. 8, the first interface and the second interface should correspond to different physical interfaces; for the connection relationship between the DU and the switching device shown in FIG. 9, the first interface and the second interface may correspond to different physical interfaces, or may share a same physical interface, which is not specifically limited in this embodiment of the disclosure.

In addition, this embodiment of the disclosure merely gives a schematic apparatus diagram of a DU with two input/output interfaces, so as to describe a difference between the radio access system 100 shown in FIG. 1 and the radio access system 500 shown in FIG. 5; and therefore, a difference exists between the radio access method shown in FIG. 2 and the radio access method shown in FIG. 6. Certainly, according to a different interface data requirement, there may be another interface division method, for example, the L1 processing submodule may be divided into an L1 first processing submodule and an L1 processing submodule, which is not specifically limited in this embodiment of the disclosure.

605. The switching device sends the first signal.

Specifically, the switching device further sends the first signal after receiving the first signal. Specifically, an object that the first signal is sent to needs to be determined with reference to a type of a current network and a signal type, which is not specifically limited in this embodiment of the disclosure. For example, this embodiment of the disclosure corresponds to a radio access system in an LTE network; therefore, the signal received by the switching device is an S1/X2 signal, where the S1 signal is sent to an evolved packet core network (Evolved Packet Core, EPC), and the X2 signal is sent to another base station.

Based on the description of the foregoing embodiment, relative to positions of DUs in the conventional radio access network architecture, positions of basic DUs in the method are not changed, where the basic DUs are still deployed in a site; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, by using a solution in which a switching device receives a first data packet sent by a first basic DU, and after determining to send the first data packet to a second basic DU for collaborative processing, sends the first data packet to the second basic DU, so that the second basic DU performs collaborative processing on the first data packet and a second data packet, and then the switching device receives a first signal sent by the second basic DU and sends the first signal, the method may implement mutual transmission and processing of collaborative data between sites, which may improve network performance.

This embodiment of the disclosure further provides a radio access method, where the method is applied to a switching device. In the method, a basic DU is deployed in a site; and the method is specifically described on a basis of a radio access system 1000 that is corresponding to an LTE network and shown in FIG. 10. It is assumed that the radio access system 1000 shown in FIG. 10 includes five basic DUs, which are a DU 1001, a DU 1002, a DU 1003, a DU 1004, and a DU 1005; and the system 1000 further includes RUs, a transmission network 1006, a switching device 1007, and two extended DUs, which are an extended DU 1008 and an extended DU 1009, where the extended DUs are deployed together with the switching device. As shown in FIG. 11, the method includes:

1101. A switching device receives a first data packet sent by a first basic DU, and receives a second data packet sent by a second basic DU, where the first data packet and the second data packet are of a same data type.

This embodiment of the disclosure does not specifically limit the number of the first basic DUs or the second basic DUs, where there may be one or more first basic DUs or second basic DUs. The first basic DU and the second basic DU have a same technical feature; and one of any two basic DUs having the technical feature may be referred to as a first basic DU, and the other one is referred to as a second basic DU.

Figure 10:
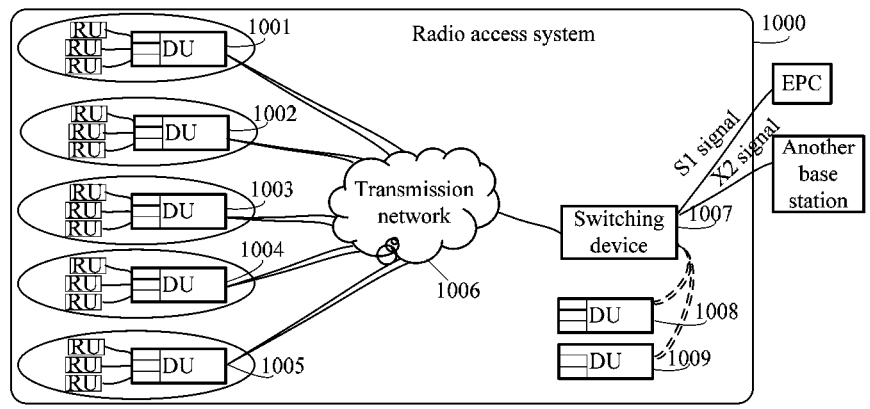
FIG. 10 is a radio access system according to an embodiment of the disclosure.
Figure 11:
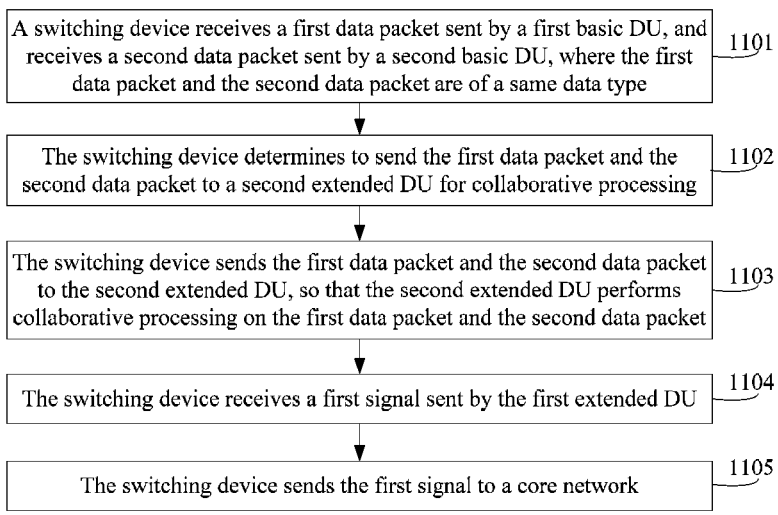
FIG. 11 is a radio access method according to an embodiment of the disclosure.

For example, in FIG. 10, the first basic DU may be the DU 1001, and the second basic DU may be the DU 1002. Certainly, if the DU 1003 also has the technical feature of the DU 1002 or the DU 1001, the DU 1003 may be referred to as a second basic DU relative to the DU 1001, or the DU 1003 may be referred to as a first basic DU relative to the DU 1002.

Similarly, if the DU 1004 also has the technical feature of the DU 1001 or the DU 1002, the DU 1004 may be referred to as a second basic DU relative to the DU 1001, or the DU 1004 may be referred to as a first basic DU relative to the DU 1002.

Therefore, by analogy, the first basic DU may be one or more DUs, or the second basic DU may be one or more DUs, which is not specifically limited in this embodiment of the disclosure.

It should be noted that "first" in the first data packet does not have any special meaning, and is merely used to differentiate from a "second" data packet, a "third" data packet, a "fourth" data packet, and a "fifth" data packet in the following to indicate a data packet of a different baseband.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 10, if the DU 1001 is the first basic DU, the DU 1002 is the second basic DU, and the first data packet is a data packet sent by an L2 processing submodule of the DU 1001 to the switching device, the second data packet should be a data packet sent by an L2 processing submodule of the DU 1002 to the switching device.

The data type of the data packet may include:

L2 scheduling data, hard bit data, frequency-domain IQ data, and time-domain IQ data.

1102. The switching device determines to send the first data packet and the second data packet to a second extended DU for collaborative processing.

In some application scenarios, it is possible that a collaborative algorithm cannot be deployed because hardware of a basic DU is limited; therefore, the switching device may determine, according to a data routing policy, a bandwidth requirement of a transmission network, and a baseband processing capability of a DU, to send the first data packet and the second data packet to the second extended DU for collaborative processing, which is not specifically limited in this embodiment of the disclosure.

For example, in FIG. 10, if a data routing policy specifies that neither the DU 1001 nor the DU 1002 performs baseband processing, and the extended DU 1008 performs collaborative processing on a baseband requiring processing in the DU 1001 and a baseband requiring processing in the DU 1002, the switching device determines, according to this data routing policy, to send a first data packet sent by the DU 1001 and a second data packet sent by the DU 1002 to the DU 1008 for collaborative processing.

Certainly, because the extended DU can perform baseband processing, the extended DU may be deployed so that a base station keeps obtaining a new feature, which prolongs a service life of a baseband of an early version. Moreover, it is unnecessary to go to a site during maintenance and capacity expansion, which reduces a cost.

1103. The switching device sends the first data packet and the second data packet to the second extended DU, so that the second extended DU performs collaborative processing on the first data packet and the second data packet.

For example, in FIG. 10, if the switching device determines to send a first data packet sent by the DU 1001 and a second data packet sent by the DU 1002 to the DU 1008 for collaborative processing, the switching device sends the first data packet and the second data packet to the DU 1008, so that the DU 1008 performs collaborative processing on the first data packet and the second data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be deemed as second extended DUs.

1104. The switching device receives a first signal sent by the second extended DU.

Specifically, the radio access system 1000 shown in FIG. 10 is different from the radio access system 300 shown in FIG. 3, where a signal in the system 300 is directly sent to a core network by using a transmission network, but a signal in the system 1000 is sent to the switching device by using a transmission network, and then sent by the switching device to a core network; therefore, relative to the radio access method shown in FIG. 4, in the radio access method provided in this embodiment, the switching device, after sending the first data packet and the second data packet to the first extended DU so that the first extended DU performs collaborative processing on the first data packet and the second data packet, further receives the first signal sent by the first extended DU.

It should be noted that "first" in the first signal does not have any special meaning, and is merely used to differentiate from a "second" signal and a "third" signal in the following.

For a reason why the switching device in this embodiment of the disclosure further receives the first signal sent by the second extended DU, reference may be made to a description of step 604 in the radio access method shown in FIG. 6, which is not repeated in this embodiment of the disclosure.

1105. The switching device sends the first signal.

The switching device sends the first signal after receiving the first signal sent by the second basic DU. Specifically, an object that the first signal is sent to needs to be determined with reference to a type of a current network and a signal type, which is not specifically limited in this embodiment of the disclosure. For example, this embodiment of the disclosure corresponds to a radio access system in an LTE network; therefore, the signal received by the switching device is an S1/X2 signal, where the S1 signal is sent to an evolved packet core network (Evolved Packet Core, EPC), and the X2 signal is sent to another base station.

Based on the description of the foregoing embodiment, relative to positions of DUs in the conventional radio access network architecture, positions of basic DUs in the method are not changed, where the basic DUs are still deployed in a site, and only extended DUs are added to perform baseband collaborative processing in the extended DUs; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, by using a solution in which a switching device receives a first data packet sent by a first basic DU and a second data packet sent by a second basic DU, and after determining to send the first data packet and the second data packet to a second extended DU for collaborative processing, sends the first data packet and the second data packet to the second extended DU, so that the second extended DU performs collaborative processing on the first data packet and the second data packet, and then the switching device receives a first signal sent by the first extended DU and sends the first signal, the method may implement mutual transmission and processing of collaborative data between sites, which may improve network performance.

It should be noted that all the radio access systems 100, 300, 500, and 1000 included in Embodiment 1 are radio access systems in an LTE network; therefore, a signal transmitted by a transmission network is an S1/X2 signal, where the S1 signal is sent to an evolved packet core network (Evolved Packet Core, EPC), and the X2 signal is sent to another base station. Certainly, for networks of different types, types of signals transmitted by the transmission network are different. For example, for a global system for mobile communications (Global System for Mobile Communications, GSM) network, the transmission network transmits an Abis signal, and eventually sends the Abis signal to a base station controller (Base Station Controller, BSC); for a universal mobile telecommunications system (Universal Mobile Telecommunications System, UMTS), the transmission network transmits an Iub signal, and eventually sends the Iub signal to a radio network controller (radio network controller, RNC). This embodiment of the disclosure does not specifically limit the type of a signal transmitted by a transmission network, which needs to be determined according to an actual network type. All embodiments of the disclosure are described in an LTE network. Similar cases are not described one by one in the following embodiments.

Embodiment 2

Figure 12:
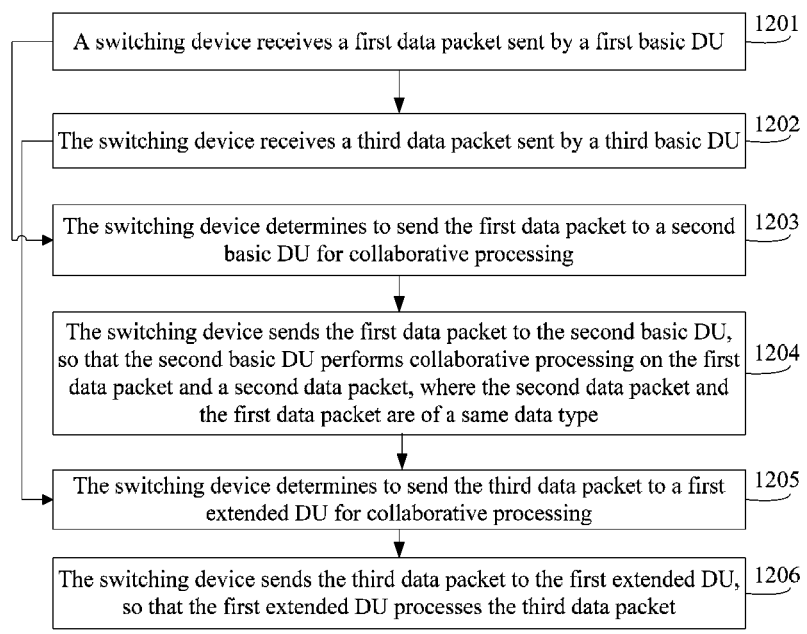
FIG. 12 is another radio access method according to an embodiment of the disclosure.

This embodiment of the disclosure provides a radio access method, where the method is applied to a switching device. In the method, a basic digital outputting unit DU is deployed in a site; and the method is specifically described on a basis of a radio access system 300 that is corresponding to an LTE network and shown in FIG. 3. As shown in FIG. 12, the method includes:

1201. A switching device receives a first data packet sent by a first basic DU.

This embodiment of the disclosure does not specifically limit the number of the first basic DUs, where there may be one or more first basic DUs, and all basic DUs having a technical feature of the first basic DU in this embodiment of the disclosure may be referred to as first basic DUs.

For example, in FIG. 3, the first basic DU may be the DU 301, the DU 302, or the DU 301 and the DU 302.

It should be noted that "first" in the first data packet does not have any special meaning, and is merely used to differentiate from a "second" data packet and a "third" data packet in this embodiment of the disclosure to indicate a data packet of a different baseband.

1202. The switching device receives a third data packet sent by a third basic DU.

This embodiment of the disclosure does not specifically limit the number of the third basic DUs, where there may be one or more third basic DUs, and all basic DUs having a technical feature of the third basic DU in this embodiment of the disclosure may be referred to as third basic DUs.

For example, in FIG. 3, the third basic DU may be the DU 301, the DU 302, or the DU 301 and the DU 302.

It should be noted that there is no necessary sequence for step 1201 and step 1202. The switching device may first receive the first data packet sent by the first basic DU, or the switching device may first receive the third data packet sent by the third basic DU, or the switching device may receive, at the same time, the first data packet sent by the first basic DU and the third data packet sent by the third basic DU, which is not specifically limited in this embodiment of the disclosure.

1203. The switching device determines to send the first data packet to a second basic DU for collaborative processing.

This embodiment of the disclosure does not specifically limit the number of the second basic DUs, where there may be one or more second basic DUs, and all basic DUs having a technical feature of the second basic DU in this embodiment of the disclosure may be referred to as second basic DUs.

For example, in FIG. 3, the second basic DU may be the DU 301, the DU 302, or the DU 303.

Specifically, after receiving the first data packet sent by the first basic DU, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

1204. The switching device sends the first data packet to the second basic DU, so that the second basic DU performs collaborative processing on the first data packet and a second data packet, where the second data packet and the first data packet are of a same data type.

For example, in FIG. 3, if the switching device determines to send a first data packet sent by the DU 301 to the DU 302 for collaborative processing, the switching device sends the first data packet to the DU 302, so that the DU 302 performs collaborative processing on the first data packet and a second data packet.

Specifically, the second data packet may be a data packet of a baseband of the second basic DU, or may include a data packet of another baseband that requires collaborative processing in the second basic DU, which is not specifically limited in this embodiment of the disclosure. This embodiment merely describes that the first data packet and the second data packet are of the same data type.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 3, if the DU 301 is the first basic DU, the DU 302 is the second basic DU, and the first data packet is a data packet sent by an L2 processing submodule of the DU 301 to the switching device, the second data packet should be a data packet output by an L2 processing submodule of the DU 302.

The data type of the data packet may include:

L2 scheduling data, hard bit data, frequency-domain IQ data, and time-domain IQ data.

1205. The switching device determines to send the third data packet to a first extended DU for processing.

Specifically, after receiving the third data packet sent by the third basic DU, the switching device may determine, according to a data routing policy, a bandwidth requirement of a transmission network, and a baseband processing capability of a DU, to send the third data packet to the first extended DU for processing, which is not specifically limited in this embodiment of the disclosure.

For example, in FIG. 3, if a baseband processing capability of the DU 303 is limited, it may be determined that a baseband processing task in the DU 303 is arranged to be processed in the DU 308. In this case, the extended DU 308 acts as a baseband resource pool of the basic DU 303, and performs baseband processing in place of the basic DU 303.

It should be noted that the first extended DU is an extended DU that acts as a baseband resource pool, where there may be one or more first extended DUs, which is not specifically limited in this embodiment of the disclosure.

1206. The switching device sends the third data packet to the first extended DU, so that the first extended DU processes the third data packet.

For example, in FIG. 3, if the switching device determines to send a third data packet sent by the DU 303 to the DU 308 for processing, the switching device sends the first data packet to the DU 308.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a basic DU, which improves network performance; and a first extended DU may be used to act as a baseband resource pool of the basic DU, which improves high availability of a system.

Figure 13:
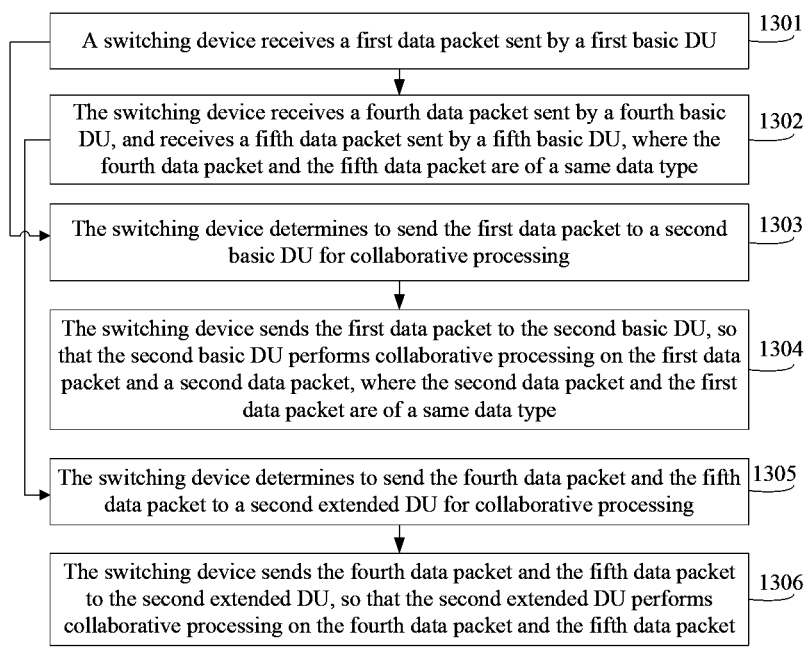
FIG. 13 is still another radio access method according to an embodiment of the disclosure.

This embodiment of the disclosure further provides a radio access method, where the method is applied to a switching device. In the method, a basic digital outputting unit DU is deployed in a site; and the method is specifically described on a basis of a radio access system 300 that is corresponding to an LTE network and shown in FIG. 3. As shown in FIG. 13, the method includes:

1301. A switching device receives a first data packet sent by a first basic DU.

This embodiment of the disclosure does not specifically limit the number of the first basic DUs, where there may be one or more first basic DUs, and all basic DUs having a technical feature of the first basic DU in this embodiment of the disclosure may be referred to as first basic DUs.

For example, in FIG. 3, the first basic DU may be the DU 301, the DU 302, or the DU 301 and the DU 302.

It should be noted that "first" in the first data packet does not have any special meaning, and is merely used to differentiate from a "second" data packet, a fourth data packet, and a fifth data packet in this embodiment of the disclosure to indicate a data packet of a different baseband.

1302. The switching device receives a fourth data packet sent by a fourth basic DU, and receives a fifth data packet sent by a fifth basic DU, where the fourth data packet and the fifth data packet are of a same data type.

This embodiment of the disclosure does not specifically limit the number of the fourth basic DUs or the fifth basic DUs, where there may be one or more fourth basic DUs or fifth basic DUs. The fourth basic DU and the fifth basic DU have a same technical feature; and one of any two basic DUs having the technical feature may be referred to as a fourth basic DU, and the other one is referred to as a fifth basic DU.

For example, in FIG. 3, the fourth basic DU may be the DU 304, and the fifth basic DU may be the DU 305. Certainly, if the DU 303 also has the technical feature of the DU 304 or the DU 305, the DU 303 may be referred to as a fifth basic DU relative to the DU 304, or the DU 303 may be referred to as a fourth basic DU relative to the DU 305.

Similarly, if the DU 302 also has the technical feature of the DU 304 or the DU 305, the DU 302 may be referred to as a fifth basic DU relative to the DU 304, or the DU 302 may be referred to as a fourth basic DU relative to the DU 305.

Therefore, by analogy, the fourth basic DU may be one or more DUs, or the fifth basic DU may be one or more DUs, which is not specifically limited in this embodiment of the disclosure.

A person of ordinary skill in the art may understand that, because a baseband is processed according to layers, that the fourth data packet and the fifth data packet are of the same data type represents, in essence, that the fourth data packet and the fifth data packet are data packets of a same sublayer of different basebands. That is, for example, in FIG. 3, if the DU 304 is the fourth basic DU, the DU 305 is the fifth basic DU, and the fourth data packet is a data packet sent by an L2 processing submodule of the DU 304 to the switching device, the fifth data packet should be a data packet sent by an L2 processing submodule of the DU 305 to the switching device.

The data type of the data packet may include:

L2 scheduling data, hard bit data, frequency-domain IQ data, and time-domain IQ data.

It should be noted that there is no necessary sequence for step 1301 and step 1302. Any one step of the steps may be performed first, which is not specifically limited in this embodiment of the disclosure.

1303. The switching device determines to send the first data packet to a second basic DU for collaborative processing.

This embodiment of the disclosure does not specifically limit the number of the second basic DUs, where there may be one or more second basic DUs, and all basic DUs having a technical feature of the second basic DU in this embodiment of the disclosure may be referred to as second basic DUs.

For example, in FIG. 3, the second basic DU may be the DU 301, the DU 302, or the DU 303.

Specifically, after receiving the first data packet sent by the first basic DU, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

1304. The switching device sends the first data packet to the second basic DU, so that the second basic DU performs collaborative processing on the first data packet and a second data packet, where the second data packet and the first data packet are of a same data type.

For example, in FIG. 3, if the switching device determines to send a first data packet sent by the DU 301 to the DU 302 for collaborative processing, the switching device sends the first data packet to the DU 302, so that the DU 302 performs collaborative processing on the first data packet and a second data packet.

Specifically, the second data packet may be a data packet of a baseband of the second basic DU, or may include a data packet of another baseband that requires collaborative processing in the second basic DU, which is not specifically limited in this embodiment of the disclosure. This embodiment merely describes that the first data packet and the second data packet are of the same data type.

For the first data packet and the second data packet of the same type, reference may be made to the foregoing explanation for the fourth data packet and the fifth data packet of the same data type, which is not repeated herein.

1305. The switching device determines to send the fourth data packet and the fifth data packet to a second extended DU for collaborative processing.

Specifically, after receiving the fourth data packet sent by the fourth basic DU and receiving the fifth data packet sent by the fifth basic DU, the switching device may determine, according to a data routing policy, a bandwidth requirement of a transmission network, and a baseband processing capability of a DU, to send the fourth data packet and the fifth data packet to the second extended DU for collaborative processing, which is not specifically limited in this embodiment of the disclosure.

1306. The switching device sends the fourth data packet and the fifth data packet to the second extended DU, so that the second extended DU performs collaborative processing on the fourth data packet and the fifth data packet.

For example, in FIG. 3, if the switching device determines to send a fourth data packet sent by the DU 304 and a fifth data packet sent by the DU 305 to the DU 309 for collaborative processing, the switching device sends the fourth data packet and the fifth data packet to the DU 309, so that the DU 309 performs collaborative processing on the fourth data packet and the fifth data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be deemed as second extended DUs.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a basic DU, which may improve network performance; and further, baseband collaborative processing may be performed in an extended DU, which may not only further improve the network performance, but also improve high availability of a system.

Figure 14:
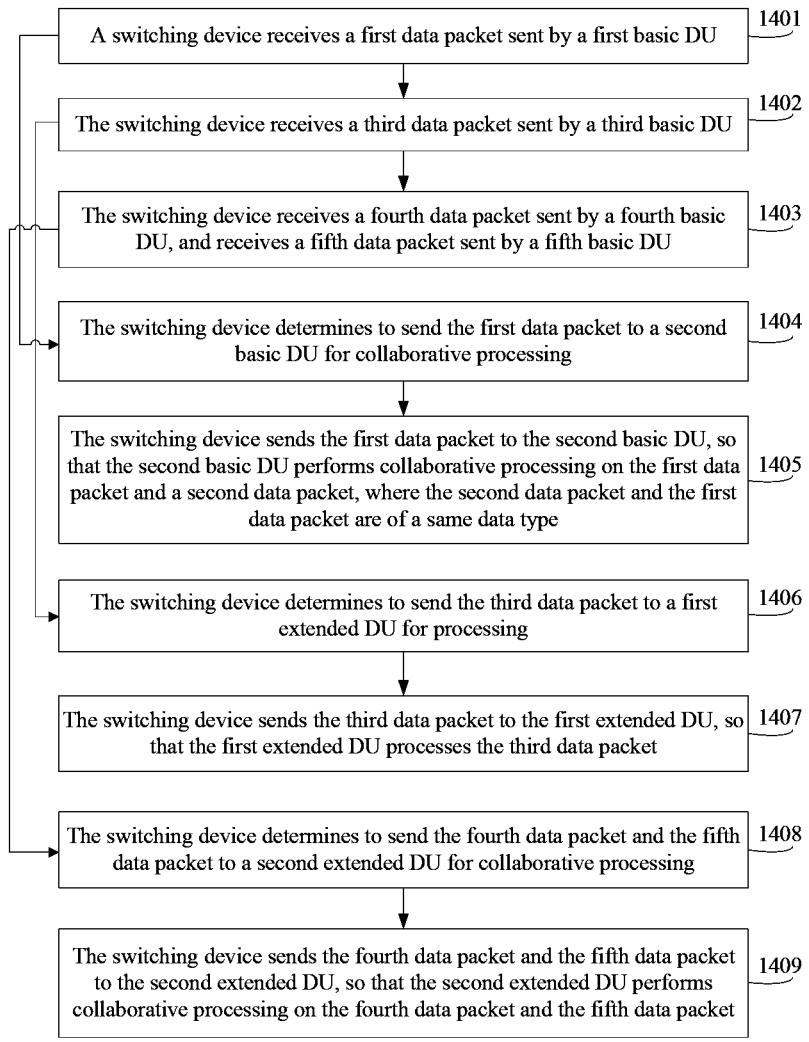
FIG. 14 is still another radio access method according to an embodiment of the disclosure.

This embodiment of the disclosure further provides a radio access method, where the method is applied to a switching device. In the method, a basic digital outputting unit DU is deployed in a site; and the method is specifically described on a basis of a radio access system 300 that is corresponding to an LTE network and shown in FIG. 3. As shown in FIG. 14, the method includes:

1401. A switching device receives a first data packet sent by a first basic DU.

This embodiment of the disclosure does not specifically limit the number of the first basic DUs, where there may be one or more first basic DUs, and all basic DUs having a technical feature of the first basic DU in this embodiment of the disclosure may be referred to as first basic DUs.

For example, in FIG. 3, the first basic DU may be the DU 301, the DU 302, or the DU 301 and the DU 302.

It should be noted that "first" in the first data packet does not have any special meaning, and is merely used to differentiate from a "second" data packet, a "third" data packet, a "fourth" data packet, and a "fifth" data packet in this embodiment of the disclosure to indicate a data packet of a different baseband.

1402. The switching device receives a third data packet sent by a third basic DU.

This embodiment of the disclosure does not specifically limit the number of the third basic DUs, where there may be one or more third basic DUs, and all basic DUs having a technical feature of the third basic DU in this embodiment of the disclosure may be referred to as third basic DUs.

For example, in FIG. 3, the third basic DU may be the DU 301, the DU 302, or the DU 301 and the DU 302.

1403. The switching device receives a fourth data packet sent by a fourth basic DU, and receives a fifth data packet sent by a fifth basic DU.

This embodiment of the disclosure does not specifically limit the number of the fourth basic DUs or the fifth basic DUs, where there may be one or more fourth basic DUs or fifth basic DUs. The fourth basic DU and the fifth basic DU have a same technical feature; and one of any two basic DUs having the technical feature may be referred to as a fourth basic DU, and the other one is referred to as a fifth basic DU.

For example, in FIG. 3, the fourth basic DU may be the DU 304, and the fifth basic DU may be the DU 305. Certainly, if the DU 303 also has the technical feature of the DU 304 or the DU 305, the DU 303 may be referred to as a fifth basic DU relative to the DU 304, or the DU 303 may be referred to as a fourth basic DU relative to the DU 305.

Similarly, if the DU 302 also has the technical feature of the DU 304 or the DU 305, the DU 302 may be referred to as a fifth basic DU relative to the DU 304, or the DU 302 may be referred to as a fourth basic DU relative to the DU 305.

Therefore, by analogy, the fourth basic DU may be one or more DUs, or the fifth basic DU may be one or more DUs, which is not specifically limited in this embodiment of the disclosure.

A person of ordinary skill in the art may understand that, because a baseband is processed according to layers, that the fourth data packet and the fifth data packet are of the same data type represents, in essence, that the fourth data packet and the fifth data packet are data packets of a same sublayer of different basebands. That is, for example, in FIG. 3, if the DU 304 is the fourth basic DU, the DU 305 is the fifth basic DU, and the fourth data packet is a data packet sent by an L2 processing submodule of the DU 304 to the switching device, the fifth data packet should be a data packet sent by an L2 processing submodule of the DU 305 to the switching device.

The data type of the data packet may include:

L2 scheduling data, hard bit data, frequency-domain IQ data, and time-domain IQ data.

It should be noted that there is no necessary sequence for step 1401, step 1402, and step 1403. Any one step of the steps may be performed first or the steps may be performed at the same time, which is not specifically limited in this embodiment of the disclosure.

1404. The switching device determines to send the first data packet to a second basic DU for collaborative processing.

This embodiment of the disclosure does not specifically limit the number of the second basic DUs, where there may be one or more second basic DUs, and all basic DUs having a technical feature of the second basic DU in this embodiment of the disclosure may be referred to as second basic DUs.

For example, in FIG. 3, the second basic DU may be the DU 301, the DU 302, or the DU 303.

Specifically, after receiving the first data packet sent by the first basic DU, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

1405. The switching device sends the first data packet to the second basic DU, so that the second basic DU performs collaborative processing on the first data packet and a second data packet, where the second data packet and the first data packet are of a same data type.

For example, in FIG. 3, if the switching device determines to send a first data packet sent by the DU 301 to the DU 302 for collaborative processing, the switching device sends the first data packet to the DU 302, so that the DU 302 performs collaborative processing on the first data packet and a second data packet.

Specifically, the second data packet may be a data packet of a baseband of the second basic DU, or may include a data packet of another baseband that requires collaborative processing in the second basic DU, which is not specifically limited in this embodiment of the disclosure. This embodiment merely describes that the first data packet and the second data packet are of the same data type.

For the first data packet and the second data packet of the same type, reference may be made to the foregoing explanation for the fourth data packet and the fifth data packet of the same data type, which is not repeated herein.

The data type of the data packet may include:

L2 scheduling data, hard bit data, frequency-domain IQ data, and time-domain IQ data.

1406. The switching device determines to send the third data packet to a first extended DU for processing.

Specifically, after receiving the third data packet sent by the third basic DU, the switching device may determine, according to a data routing policy, a bandwidth requirement of a transmission network, and a baseband processing capability of a DU, to send the third data packet to the first extended DU for processing, which is not specifically limited in this embodiment of the disclosure.

For example, in FIG. 3, if a baseband processing capability of the DU 303 is limited, it may be determined that a baseband processing task in the DU 303 is arranged to be processed in the DU 308. In this case, the extended DU 308 acts as a baseband resource pool of the basic DU 303, and performs baseband processing in place of the basic DU 303.

It should be noted that the first extended DU is an extended DU that acts as a baseband resource pool, where there may be one or more first extended DUs, which is not specifically limited in this embodiment of the disclosure.

1407. The switching device sends the third data packet to the first extended DU, so that the first extended DU processes the third data packet.

For example, in FIG. 3, if the switching device determines to send a third data packet sent by the DU 303 to the DU 308 for processing, the switching device sends the first data packet to the DU 308.

1408. The switching device determines to send the fourth data packet and the fifth data packet to a second extended DU for collaborative processing.

Specifically, after receiving the fourth data packet sent by the fourth basic DU and receiving the fifth data packet sent by the fifth basic DU, the switching device may determine, according to a data routing policy, a bandwidth requirement of a transmission network, and a baseband processing capability of a DU, to send the fourth data packet and the fifth data packet to the second extended DU for processing, which is not specifically limited in this embodiment of the disclosure.

1409. The switching device sends the fourth data packet and the fifth data packet to the second extended DU, so that the second extended DU performs collaborative processing on the fourth data packet and the fifth data packet.

For example, in FIG. 3, if the switching device determines to send a fourth data packet sent by the DU 304 and a fifth data packet sent by the DU 305 to the DU 309 for collaborative processing, the switching device sends the fourth data packet and the fifth data packet to the DU 309, so that the DU 309 performs collaborative processing on the fourth data packet and the fifth data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be referred to as second extended DUs.

Certainly, in this embodiment of the disclosure, the first extended DU and the second extended DU may be the same extended DU. That is, one extended DU may perform baseband collaborative processing, and may act as a baseband resource pool at the same time, which is not specifically limited in this embodiment of the disclosure.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a basic DU, which improves network performance; and a first extended DU may be used to act as a baseband resource pool of the basic DU, which improves high availability of a system; and further, baseband collaborative processing may be performed in a second extended DU, which may not only further improve the network performance, but also further improve the high availability of the system.

Figure 15:
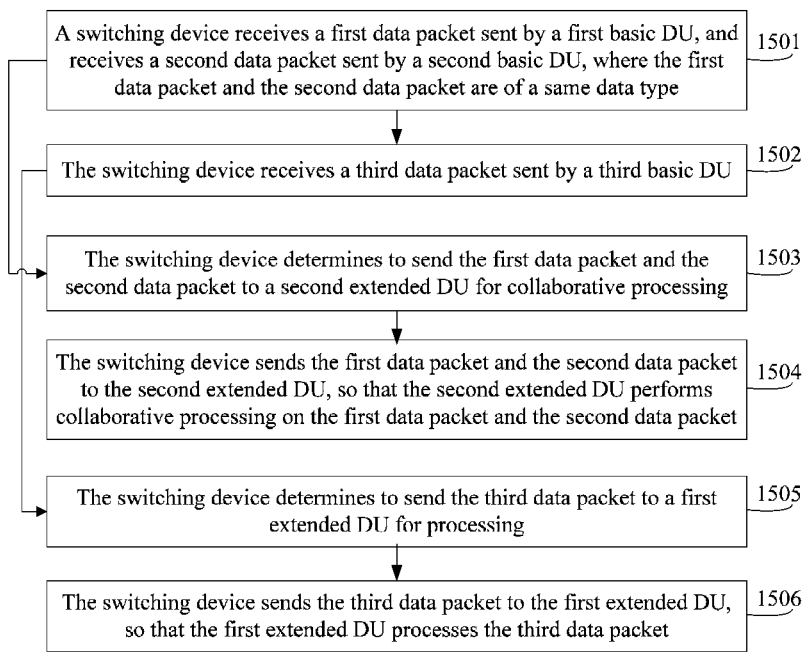
FIG. 15 is still another radio access method according to an embodiment of the disclosure.

This embodiment of the disclosure further provides a radio access method, where the method is applied to a switching device. In the method, a basic digital outputting unit DU is deployed in a site; and the method is specifically described on a basis of a radio access system 300 that is corresponding to an LTE network and shown in FIG. 3. As shown in FIG. 15, the method includes:

1501. A switching device receives a first data packet sent by a first basic DU, and receives a second data packet sent by a second basic DU, where the first data packet and the second data packet are of a same data type.

This embodiment of the disclosure does not specifically limit the number of the first basic DUs or the second basic DUs, where there may be one or more first basic DUs or second basic DUs. The first basic DU and the second basic DU have a same technical feature; and one of any two basic DUs having the technical feature may be referred to as a first basic DU, and the other one is referred to as a second basic DU.

For example, in FIG. 3, the first basic DU may be the DU 304, and the second basic DU may be the DU 305. Certainly, if the DU 303 also has the technical feature of the DU 304 or the DU 305, the DU 303 may be referred to as a second basic DU relative to the DU 304, or the DU 303 may be referred to as a first basic DU relative to the DU 305.

Similarly, if the DU 302 also has the technical feature of the DU 304 or the DU 305, the DU 302 may be referred to as a second basic DU relative to the DU 304, or the DU 302 may be referred to as a first basic DU relative to the DU 305.

Therefore, by analogy, the first basic DU may be one or more DUs, or the second basic DU may be one or more DUs, which is not specifically limited in this embodiment of the disclosure.

It should be noted that "first" in the first data packet does not have any special meaning, and is merely used to differentiate from a "second" data packet and a "third" data packet in this embodiment of the disclosure to indicate a data packet of a different baseband.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 3, if the DU 304 is the first basic DU, the DU 305 is the second basic DU, and the first data packet is a data packet sent by an L2 processing submodule of the DU 304 to the switching device, the second data packet should be a data packet sent by an L2 processing submodule of the DU 305 to the switching device.

The data type of the data packet may include:

L2 scheduling data, hard bit data, frequency-domain IQ data, and time-domain IQ data.

1502. The switching device receives a third data packet sent by a third basic DU.

This embodiment of the disclosure does not specifically limit the number of the third basic DUs, where there may be one or more third basic DUs, and all basic DUs having a technical feature of the third basic DU in this embodiment of the disclosure may be referred to as third basic DUs.

For example, in FIG. 3, the third basic DU may be the DU 301, the DU 302, or the DU 301 and the DU 302.

It should be noted that there is no necessary sequence for step 1501 and step 1502. Any one step of the steps may be performed first or the steps may be performed at the same time, which is not specifically limited in this embodiment of the disclosure.

1503. The switching device determines to send the first data packet and the second data packet to a second extended DU for collaborative processing.

Specifically, after receiving the first data packet sent by the first basic DU and receiving the second data packet sent by the second basic DU, the switching device may determine, according to a data routing policy, a bandwidth requirement of a transmission network, and a baseband processing capability of a DU, to send the first data packet and the second data packet to the second extended DU for processing, which is not specifically limited in this embodiment of the disclosure.

1504. The switching device sends the first data packet and the second data packet to the second extended DU, so that the second extended DU performs collaborative processing on the first data packet and the second data packet.

For example, in FIG. 3, if the switching device determines to send a first data packet sent by the DU 304 and a second data packet sent by the DU 305 to the DU 309 for collaborative processing, the switching device sends the first data packet and the second data packet to the DU 309, so that the DU 309 performs collaborative processing on the first data packet and the second data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be deemed as second extended DUs.

1505. The switching device determines to send the third data packet to a first extended DU for processing.

Specifically, after receiving the third data packet sent by the third basic DU, the switching device may determine, according to a data routing policy, a bandwidth requirement of a transmission network, and a baseband processing capability of a DU, to send the third data packet to the first extended DU for processing, which is not specifically limited in this embodiment of the disclosure.

For example, in FIG. 3, if a baseband processing capability of the DU 303 is limited, it may be determined that a baseband processing task in the DU 303 is arranged to be processed in the DU 308. In this case, the extended DU 308 acts as a baseband resource pool of the basic DU 303, and performs baseband processing in place of the basic DU 303.

It should be noted that the first extended DU is an extended DU that acts as a baseband resource pool, where there may be one or more first extended DUs, which is not specifically limited in this embodiment of the disclosure.

1506. The switching device sends the third data packet to the first extended DU, so that the first extended DU processes the third data packet.

For example, in FIG. 3, if the switching device determines to send a third data packet sent by the DU 303 to the DU 308 for processing, the switching device sends the first data packet to the DU 308.

Certainly, in this embodiment of the disclosure, the first extended DU and the second extended DU may be the same extended DU. That is, one extended DU may perform baseband collaborative processing, and may act as a baseband resource pool at the same time, which is not specifically limited in this embodiment of the disclosure.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a second extended DU, which may not only improve network performance, but also improve high availability of a system. Moreover, a first extended DU may be used to act as a baseband resource pool of a basic DU, which further improves the high availability of the system.

Figure 16:
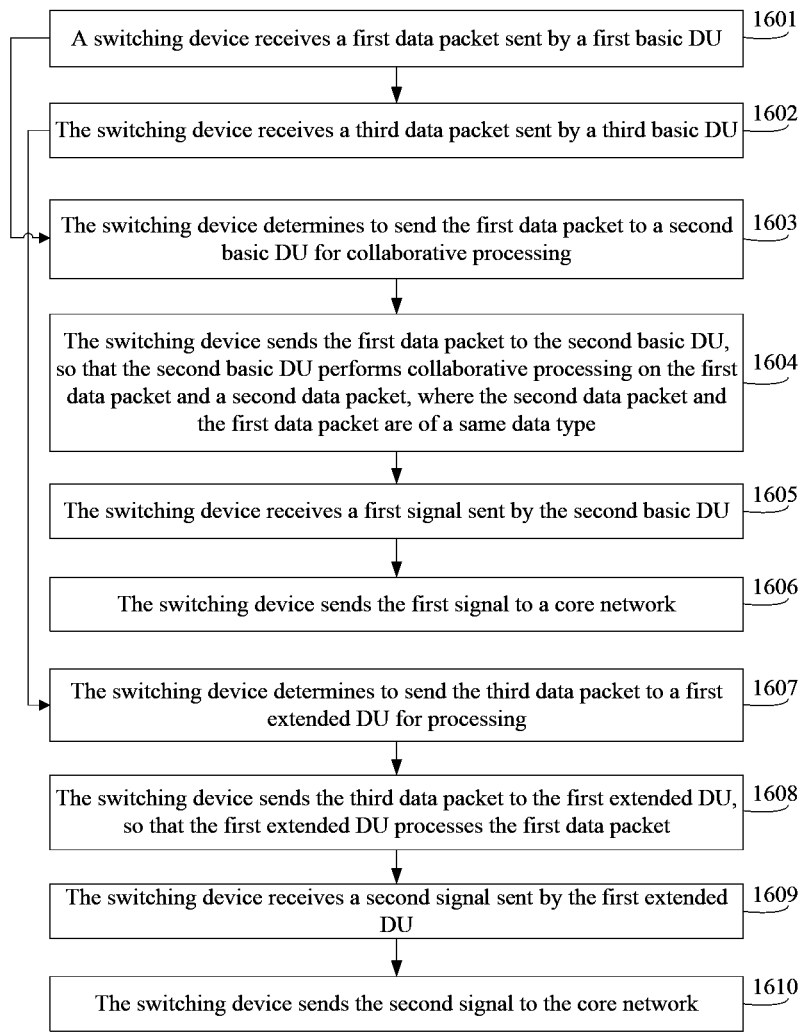
FIG. 16 is still another radio access method according to an embodiment of the disclosure.

This embodiment of the disclosure further provides a radio access method, where the method is applied to a switching device. In the method, a basic digital outputting unit DU is deployed in a site; and the method is specifically described on a basis of a radio access system 1000 that is corresponding to an LTE network and shown in FIG. 10. As shown in FIG. 16, the method includes:

1601. A switching device receives a first data packet sent by a first basic DU.

Specifically, this embodiment of the disclosure does not specifically limit the number of the first basic DUs, where there may be one or more first basic DUs, and all basic DUs having a technical feature of the first basic DU in this embodiment of the disclosure may be referred to as first basic DUs.

For example, in FIG. 10, the first basic DU may be the DU 1001, the DU 1002, or the DU 1001 and the DU 1002.

It should be noted that "first" in the first data packet does not have any special meaning, and is merely used to differentiate from a "second" data packet and a "third" data packet in this embodiment of the disclosure to indicate a data packet of a different baseband.

1602. The switching device receives a third data packet sent by a third basic DU.

This embodiment of the disclosure does not specifically limit the number of the third basic DUs, where there may be one or more third basic DUs, and all basic DUs having a technical feature of the third basic DU in this embodiment of the disclosure may be referred to as third basic DUs.

For example, in FIG. 10, the third basic DU may be the DU 1001, the DU 1002, or the DU 1001 and the DU 1002.

It should be noted that there is no necessary sequence for step 1601 and step 1602. The switching device may first receive the first data packet sent by the first basic DU, or the switching device may first receive the third data packet sent by the third basic DU, or the switching device may receive, at the same time, the first data packet sent by the first basic DU and the third data packet sent by the third basic DU, which is not specifically limited in this embodiment of the disclosure.

1603. The switching device determines to send the first data packet to a second basic DU for collaborative processing.

This embodiment of the disclosure does not specifically limit the number of the second basic DUs, where there may be one or more second basic DUs, and all basic DUs having a technical feature of the second basic DU in this embodiment of the disclosure may be referred to as second basic DUs.

For example, in FIG. 10, the second basic DU may be the DU 1001, the DU 1002, or the DU 1003.

Specifically, after receiving the first data packet sent by the first basic DU, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

1604. The switching device sends the first data packet to the second basic DU, so that the second basic DU performs collaborative processing on the first data packet and a second data packet, where the second data packet and the first data packet are of a same data type.

For example, in FIG. 10, if the switching device determines to send a first data packet sent by the DU 1001 to the DU 1002 for collaborative processing, the switching device sends the first data packet to the DU 1002, so that the DU 1002 performs collaborative processing on the first data packet and a second data packet.

Specifically, the second data packet may be a data packet of a baseband of the second basic DU, or may include a data packet of another baseband that requires collaborative processing in the second basic DU, which is not specifically limited in this embodiment of the disclosure. This embodiment merely describes that the first data packet and the second data packet are of the same data type.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 10, if the DU 1001 is the first basic DU, the DU 1002 is the second basic DU, and the first data packet is a data packet sent by an L2 processing submodule of the DU 1001 to the switching device, the second data packet should be a data packet output by an L2 processing submodule of the DU 1002.

The data type of the data packet may include:
L2 scheduling data, hard bit data, frequency-domain IQ data, and time-domain IQ data.

1605. The switching device receives a first signal sent by the second basic DU.

Specifically, the radio access system 1000 shown in FIG. 10 is different from the radio access system 300 shown in FIG. 3, where a signal in the system 300 is directly sent to a core network by using a transmission network, but a signal in the system 1000 is sent to the switching device by using a transmission network, and then sent by the switching device to a core network; therefore, relative to the radio access method shown in FIG. 12, in the radio access method provided in this embodiment, the switching device, after sending the first data packet to the second basic DU so that the second basic DU performs collaborative processing on the first data packet and the second data packet, further receives the first signal sent by the second basic DU.

It should be noted that "first" in the first signal does not have any special meaning, and is merely used to differentiate from a "second" signal and a "third" signal in the following.

For a reason why the switching device in this embodiment of the disclosure further receives the first signal sent by the second basic DU, reference may be made to a description of step 604 in the radio access method shown in FIG. 6, which is not repeated in this embodiment of the disclosure.

1606. The switching device sends the first signal.

1607. The switching device determines to send the third data packet to a first extended DU for processing.

Specifically, after receiving the third data packet sent by the third basic DU, the switching device may determine, according to a data routing policy, a bandwidth requirement of a transmission network, and a baseband processing capability of a DU, to send the third data packet to the first extended DU for processing, which is not specifically limited in this embodiment of the disclosure.

For example, in FIG. 10, if a baseband processing capability of the DU 1003 is limited, it may be determined that a baseband processing task in the DU 1003 is arranged to be processed in the DU 1008. In this case, the extended DU 1008 acts as a baseband resource pool of the basic DU 1003, and performs baseband processing in place of the basic DU 1003.

It should be noted that the first extended DU is an extended DU that acts as a baseband resource pool, where there may be one or more first extended DUs, which is not specifically limited in this embodiment of the disclosure.

1608. The switching device sends the third data packet to the first extended DU, so that the first extended DU processes the first data packet.

For example, in FIG. 10, if the switching device determines to send a third data packet sent by the DU 1003 to the DU 1008 for processing, the switching device sends the first data packet to the DU 1008.

1609. The switching device receives a second signal sent by the first extended DU.

Specifically, relative to the radio access method shown in FIG. 12, for a reason why the switching device in this embodiment of the disclosure further receives the second signal sent by the first extended DU after sending the third data packet to the first extended DU, reference may be made to a description of step 1605, which is not repeated in this embodiment of the disclosure.

1610. The switching device sends the second signal.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a basic DU, which improves network performance; and a first extended DU may be used to act as a baseband resource pool of the basic DU, which improves high availability of a system.

Figure 17:
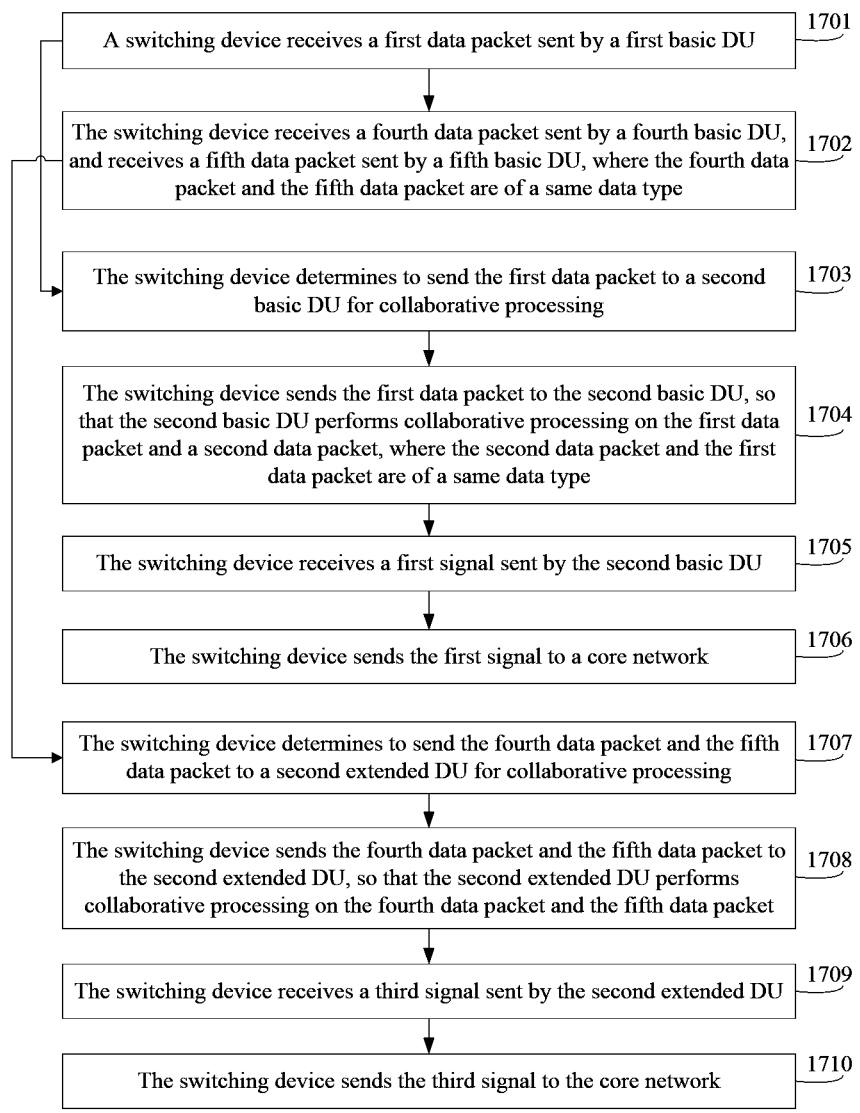
FIG. 17 is still another radio access method according to an embodiment of the disclosure.

This embodiment of the disclosure further provides a radio access method, where the method is applied to a switching device. In the method, a basic digital outputting unit DU is deployed in a site; and the method is specifically described on a basis of a radio access system 1000 that is corresponding to an LTE network and shown in FIG. 10. As shown in FIG. 17, the method includes:

1701. A switching device receives a first data packet sent by a first basic DU.

This embodiment of the disclosure does not specifically limit the number of the first basic DUs, where there may be one or more first basic DUs, and all basic DUs having a technical feature of the first basic DU in this embodiment of the disclosure may be referred to as first basic DUs.

For example, in FIG. 10, the first basic DU may be the DU 1001, the DU 1002, or the DU 1001 and the DU 1002.

It should be noted that "first" in the first data packet does not have any special meaning, and is merely used to differentiate from a "second" data packet, a fourth data packet, and a fifth data packet in this embodiment of the disclosure to indicate a data packet of a different baseband.

1702. The switching device receives a fourth data packet sent by a fourth basic DU, and receives a fifth data packet sent by a fifth basic DU, where the fourth data packet and the fifth data packet are of a same data type.

This embodiment of the disclosure does not specifically limit the number of the fourth basic DUs or the fifth basic DUs, where there may be one or more fourth basic DUs or fifth basic DUs. The fourth basic DU and the fifth basic DU have a same technical feature; and one of any two basic DUs having the technical feature may be referred to as a fourth basic DU, and the other one is referred to as a fifth basic DU.

For example, in FIG. 10, the fourth basic DU may be the DU 1004, and the fifth basic DU may be the DU 1005. Certainly, if the DU 1003 also has the technical feature of the DU 1004 or the DU 1005, the DU 1003 may be referred to as a fifth basic DU relative to the DU 1004, or the DU 1003 may be referred to as a fourth basic DU relative to the DU 1005.

Similarly, if the DU 1002 also has the technical feature of the DU 1004 or the DU 1005, the DU 1002 may be referred to as a fifth basic DU relative to the DU 1004, or the DU 1002 may be referred to as a fourth basic DU relative to the DU 1005.

Therefore, by analogy, the fourth basic DU may be one or more DUs, or the fifth basic DU may be one or more DUs, which is not specifically limited in this embodiment of the disclosure.

A person of ordinary skill in the art may understand that, because a baseband is processed according to layers, that the fourth data packet and the fifth data packet are of the same data type represents, in essence, that the fourth data packet and the fifth data packet are data packets of a same sublayer of different basebands. That is, for example, in FIG. 10, if the DU 1004 is the fourth basic DU, the DU 1005 is the fifth basic DU, and the fourth data packet is a data packet sent by an L2 processing submodule of the DU 1004 to the switching device, the fifth data packet should be a data packet sent by an L2 processing submodule of the DU 1005 to the switching device.

The data type of the data packet may include:
L2 scheduling data, hard bit data, frequency-domain IQ data, and time-domain IQ data.

It should be noted that there is no necessary sequence for step 1701 and step 1702. Any one step of the steps may be performed first, which is not specifically limited in this embodiment of the disclosure.

1703. The switching device determines to send the first data packet to a second basic DU for collaborative processing.

Specifically, this embodiment of the disclosure does not specifically limit the number of the second basic DUs, where there may be one or more second basic DUs, and all basic DUs having a technical feature of the second basic DU in this embodiment of the disclosure may be referred to as second basic DUs.

For example, in FIG. 10, the second basic DU may be the DU 1001, the DU 1002, or the DU 1003.

Specifically, after receiving the first data packet sent by the first basic DU, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

1704. The switching device sends the first data packet to the second basic DU, so that the second basic DU performs collaborative processing on the first data packet and a second data packet, where the second data packet and the first data packet are of a same data type.

For example, in FIG. 10, if the switching device determines to send a first data packet sent by the DU 1001 to the DU 1002 for collaborative processing, the switching device sends the first data packet to the DU 1002, so that the DU 1002 performs collaborative processing on the first data packet and a second data packet.

Specifically, the second data packet may be a data packet of a baseband of the second basic DU, or may include a data packet of another baseband that requires collaborative processing in the second basic DU, which is not specifically limited in this embodiment of the disclosure. This embodiment merely describes that the first data packet and the second data packet are of the same data type.

For the first data packet and the second data packet of the same type, reference may be made to the foregoing explanation for the fourth data packet and the fifth data packet of the same data type, which is not repeated herein.

1705. The switching device receives a first signal sent by the second basic DU.

Specifically, the radio access system 1000 shown in FIG. 10 is different from the radio access system 300 shown in FIG. 3, where a signal in the system 300 is directly sent to a core network by using a transmission network, but a signal in the system 1000 is sent to the switching device by using a transmission network, and then sent by the switching device to a core network; therefore, relative to the radio access method shown in FIG. 13, in the radio access method provided in this embodiment, the switching device, after sending the first data packet to the second basic DU so that the second basic DU performs collaborative processing on the first data packet and the second data packet, further receives the first signal sent by the second basic DU.

It should be noted that "first" in the first signal does not have any special meaning, and is merely used to differentiate from a "second" signal and a "third" signal in the following.

For a reason why the switching device in this embodiment of the disclosure further receives the first signal sent by the second basic DU, reference may be made to a description of step 604 in the radio access method shown in FIG. 6, which is not repeated in this embodiment of the disclosure.

1706. The switching device sends the first signal.

1707. The switching device determines to send the fourth data packet and the fifth data packet to a second extended DU for collaborative processing.

Specifically, after receiving the fourth data packet sent by the fourth basic DU and receiving the fifth data packet sent by the fifth basic DU, the switching device may determine, according to a data routing policy, a bandwidth requirement of a transmission network, and a baseband processing capability of a DU, to send the fourth data packet and the fifth data packet to the second extended DU for collaborative processing, which is not specifically limited in this embodiment of the disclosure.

1708. The switching device sends the fourth data packet and the fifth data packet to the second extended DU, so that the second extended DU performs collaborative processing on the fourth data packet and the fifth data packet.

For example, in FIG. 10, if the switching device determines to send a fourth data packet sent by the DU 1004 and a fifth data packet sent by the DU 1005 to the DU 1009 for collaborative processing, the switching device sends the fourth data packet and the fifth data packet to the DU 1009, so that the DU 1009 performs collaborative processing on the fourth data packet and the fifth data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be deemed as second extended DUs.

1709. The switching device receives a third signal sent by the second extended DU.

Specifically, relative to the radio access method shown in FIG. 13, for a reason why the switching device in this embodiment of the disclosure further receives the third signal sent by the second extended DU after sending the fourth data packet and the fifth data packet to the second extended DU, reference may be made to a description of step 1705, which is not repeated in this embodiment of the disclosure.

1710. The switching device sends the third signal.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a basic DU, which may improve network performance; and further, baseband collaborative processing may be performed in an extended DU, which may not only further improve the network performance, but also improve high availability of a system.

Figure 18:
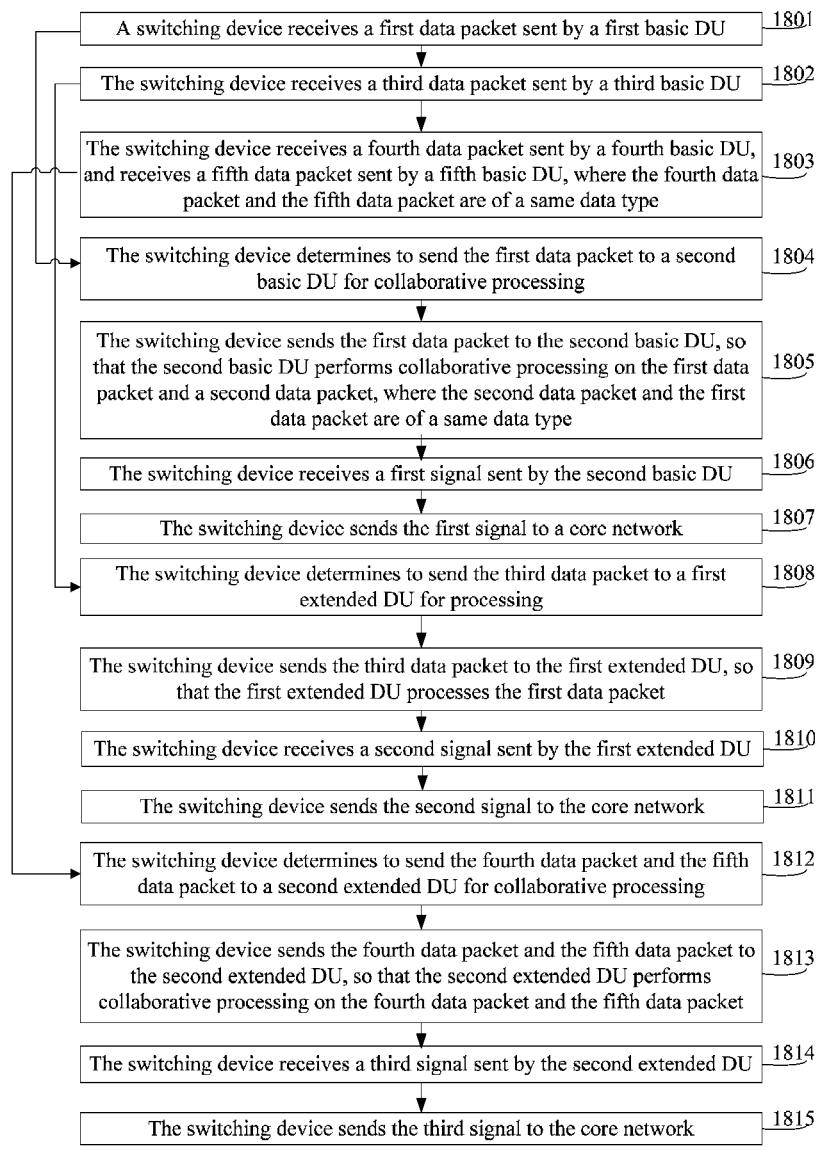
FIG. 18 is still another radio access method according to an embodiment of the disclosure.

This embodiment of the disclosure further provides a radio access method, where the method is applied to a switching device. In the method, a basic digital outputting unit DU is deployed in a site; and the method is specifically described on a basis of a radio access system 1000 that is corresponding to an LTE network and shown in FIG. 10. As shown in FIG. 18, the method includes:

1801. A switching device receives a first data packet sent by a first basic DU.

This embodiment of the disclosure does not specifically limit the number of the first basic DUs, where there may be one or more first basic DUs, and all basic DUs having a technical feature of the first basic DU in this embodiment of the disclosure may be referred to as first basic DUs.

For example, in FIG. 10, the first basic DU may be the DU 1001, the DU 1002, or the DU 1001 and the DU 1002.

It should be noted that "first" in the first data packet does not have any special meaning, and is merely used to differentiate from a "second" data packet, a "third" data packet, a "fourth" data packet, and a "fifth" data packet in this embodiment of the disclosure to indicate a data packet of a different baseband.

1802. The switching device receives a third data packet sent by a third basic DU.

This embodiment of the disclosure does not specifically limit the number of the third basic DUs, where there may be one or more third basic DUs, and all basic DUs having a technical feature of the third basic DU in this embodiment of the disclosure may be referred to as third basic DUs.

For example, in FIG. 10, the third basic DU may be the DU 1001, the DU 1002, or the DU 1001 and the DU 002.

1803. The switching device receives a fourth data packet sent by a fourth basic DU, and receives a fifth data packet sent by a fifth basic DU, where the fourth data packet and the fifth data packet are of a same data type.

This embodiment of the disclosure does not specifically limit the number of the fourth basic DUs or the fifth basic DUs, where there may be one or more fourth basic DUs or fifth basic DUs. The fourth basic DU and the fifth basic DU have a same technical feature; and one of any two basic DUs having the technical feature may be referred to as a fourth basic DU, and the other one is referred to as a fifth basic DU.

For example, in FIG. 10, the fourth basic DU may be the DU 1004, and the fifth basic DU may be the DU 1005. Certainly, if the DU 1003 also has the technical feature of the DU 1004 or the DU 1005, the DU 1003 may be referred to as a fifth basic DU relative to the DU 1004, or the DU 1003 may be referred to as a fourth basic DU relative to the DU 1005.

Similarly, if the DU 1002 also has the technical feature of the DU 1004 or the DU 1005, the DU 1002 may be referred to as a fifth basic DU relative to the DU 1004, or the DU 1002 may be referred to as a fourth basic DU relative to the DU 1005.

Therefore, by analogy, the fourth basic DU may be one or more DUs, or the fifth basic DU may be one or more DUs, which is not specifically limited in this embodiment of the disclosure.

A person of ordinary skill in the art may understand that, because a baseband is processed according to layers, that the fourth data packet and the fifth data packet are of the same data type represents, in essence, that the fourth data packet and the fifth data packet are data packets of a same sublayer of different basebands. That is, for example, in FIG. 10, if the DU 1004 is the fourth basic DU, the DU 1005 is the fifth basic DU, and the fourth data packet is a data packet sent by an L2 processing submodule of the DU 1004 to the switching device, the fifth data packet should be a data packet sent by an L2 processing submodule of the DU 1005 to the switching device.

The data type of the data packet may include:

L2 scheduling data, hard bit data, frequency-domain IQ data, and time-domain IQ data.

It should be noted that there is no necessary sequence for step 1801, step 1802, and step 1803. Any one step of the steps may be performed first or the steps may be performed at the same time, which is not specifically limited in this embodiment of the disclosure.

1804. The switching device determines to send the first data packet to a second basic DU for collaborative processing.

This embodiment of the disclosure does not specifically limit the number of the second basic DUs, where there may be one or more second basic DUs, and all basic DUs having a technical feature of the second basic DU in this embodiment of the disclosure may be referred to as second basic DUs.

For example, in FIG. 10, the second basic DU may be the DU 1001, the DU 1002, or the DU 1003.

Specifically, after receiving the first data packet sent by the first basic DU, the switching device may determine, according to a data routing policy, a bandwidth requirement of a transmission network, and a baseband processing capability of a DU, to send the first data packet to the second basic DU for collaborative processing, which is not specifically limited in this embodiment of the disclosure.

1805. The switching device sends the first data packet to the second basic DU, so that the second basic DU performs collaborative processing on the first data packet and a second data packet, where the second data packet and the first data packet are of a same data type.

For example, in FIG. 10, if the switching device determines to send a first data packet sent by the DU 1001 to the DU 1002 for collaborative processing, the switching device sends the first data packet to the DU 1002, so that the DU 1002 performs collaborative processing on the first data packet and a second data packet.

Specifically, the second data packet may be a data packet of a baseband of the second basic DU, or may include a data packet of another baseband that requires collaborative processing in the second basic DU, which is not specifically limited in this embodiment of the disclosure. This embodiment merely describes that the first data packet and the second data packet are of the same data type.

For the first data packet and the second data packet of the same type, reference may be made to the foregoing explanation for the fourth data packet and the fifth data packet of the same data type, which is not repeated herein.

The data type of the data packet may include:
L2 scheduling data, hard bit data, frequency-domain IQ data, and time-domain IQ data.

1806. The switching device receives a first signal sent by the second basic DU.

Specifically, the radio access system 1000 shown in FIG. 10 is different from the radio access system 300 shown in FIG. 3, where a signal in the system 300 is directly sent to a core network by using a transmission network, but a signal in the system 1000 is sent to the switching device by using a transmission network, and then sent by the switching device to a core network; therefore, relative to the radio access method shown in FIG. 14, in the radio access method provided in this embodiment, the switching device, after sending the first data packet to the second basic DU so that the second basic DU performs collaborative processing on the first data packet and the second data packet, further receives the first signal sent by the second basic DU.

It should be noted that "first" in the first signal does not have any special meaning, and is merely used to differentiate from a "second" signal and a "third" signal in the following.

For a reason why the switching device in this embodiment of the disclosure further receives the first signal sent by the second basic DU, reference may be made to a description of step 604 in the radio access method shown in FIG. 6, which is not repeated in this embodiment of the disclosure.

1807. The switching device sends the first signal.

1808. The switching device determines to send the third data packet to a first extended DU for processing.

Specifically, after receiving the third data packet sent by the third basic DU, the switching device may determine, according to a data routing policy, a bandwidth requirement of a transmission network, and a baseband processing capability of a DU, to send the third data packet to the first extended DU for processing, which is not specifically limited in this embodiment of the disclosure.

For example, in FIG. 10, if a baseband processing capability of the DU 1003 is limited, it may be determined that a baseband processing task in the DU 1003 is arranged to be processed in the DU 1008. In this case, the extended DU 1008 acts as a baseband resource pool of the basic DU 1003, and performs baseband processing in place of the basic DU 1003.

It should be noted that the first extended DU is an extended DU that acts as a baseband resource pool, where there may be one or more first extended DUs, which is not specifically limited in this embodiment of the disclosure.

1809. The switching device sends the third data packet to the first extended DU, so that the first extended DU processes the first data packet.

For example, in FIG. 10, if the switching device determines to send a third data packet sent by the DU 1003 to the DU 1008 for processing, the switching device sends the first data packet to the DU 1008.

1810. The switching device receives a second signal sent by the first extended DU.

Specifically, relative to the radio access method shown in FIG. 14, for a reason why the switching device in this embodiment of the disclosure further receives the second signal sent by the first extended DU after sending the third data packet to the first extended DU, reference may be made to a description of step 1806, which is not repeated in this embodiment of the disclosure.

1811. The switching device sends the second signal.

1812. The switching device determines to send the fourth data packet and the fifth data packet to a second extended DU for collaborative processing.

Specifically, after receiving the fourth data packet sent by the fourth basic DU and receiving the fifth data packet sent by the fifth basic DU, the switching device may determine, according to a data routing policy, a bandwidth requirement of a transmission network, and a baseband processing capability of a DU, to send the fourth data packet and the fifth data packet to the second extended DU for processing, which is not specifically limited in this embodiment of the disclosure.

1813. The switching device sends the fourth data packet and the fifth data packet to the second extended DU, so that the second extended DU performs collaborative processing on the fourth data packet and the fifth data packet.

For example, in FIG. 10, if the switching device determines to send a fourth data packet sent by the DU 1004 and a fifth data packet sent by the DU 1005 to the DU 1009 for collaborative processing, the switching device sends the fourth data packet and the fifth data packet to the DU 1009, so that the DU 1009 performs collaborative processing on the fourth data packet and the fifth data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be deemed as second extended DUs.

Certainly, in this embodiment of the disclosure, the first extended DU and the second extended DU may be the same extended DU. That is, one extended DU may perform baseband collaborative processing, and may act as a baseband resource pool at the same time, which is not specifically limited in this embodiment of the disclosure.

1814. The switching device receives a third signal sent by the second extended DU.

Specifically, relative to the radio access method shown in FIG. 14, for a reason why the switching device in this embodiment of the disclosure further receives the third signal sent by the second extended DU after sending the fourth data packet and the fifth data packet to the second extended DU, reference may be made to a description of step 1806, which is not repeated in this embodiment of the disclosure.

1815. The switching device sends the third signal.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a basic DU, which improves network performance; and a first extended DU may be used to act as a baseband resource pool of the basic DU, which improves high availability of a system; and further, baseband collaborative processing may be performed in a second extended DU, which may not only further improve the network performance, but also further improve the high availability of the system.

Figure 19:
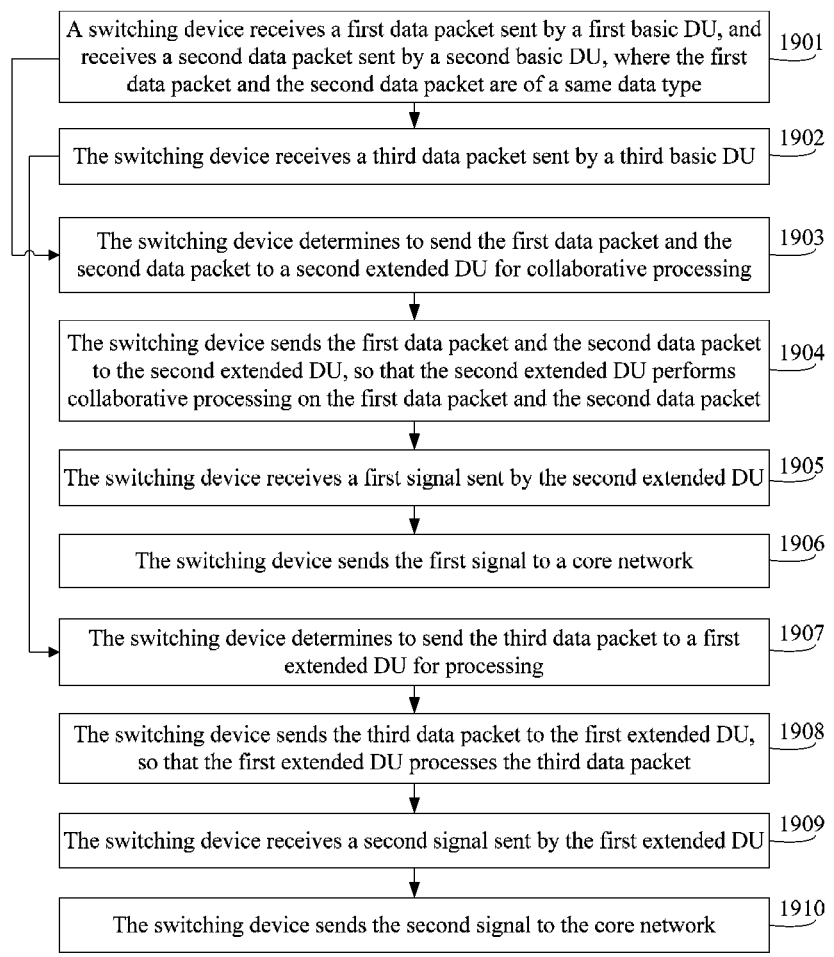
FIG. 19 is still another radio access method according to an embodiment of the disclosure.

This embodiment of the disclosure further provides a radio access method, where the method is applied to a switching device. In the method, a basic digital outputting unit DU is deployed in a site; and the method is specifically described on a basis of a radio access system 1000 that is corresponding to an LTE network and shown in FIG. 10. As shown in FIG. 19, the method includes:

1901. A switching device receives a first data packet sent by a first basic DU, and receives a second data packet sent by a second basic DU, where the first data packet and the second data packet are of a same data type.

This embodiment of the disclosure does not specifically limit the number of the first basic DUs or the second basic DUs, where there may be one or more first basic DUs or second basic DUs. The first basic DU and the second basic DU have a same technical feature; and one of any two basic DUs having the technical feature may be referred to as a first basic DU, and the other one is referred to as a second basic DU.

For example, in FIG. 10, the first basic DU may be the DU 1004, and the second basic DU may be the DU 1005. Certainly, if the DU 1003 also has the technical feature of the DU 1004 or the DU 1005, the DU 1003 may be referred to as a second basic DU relative to the DU 1004, or the DU 1003 may be referred to as a first basic DU relative to the DU 1005.

Similarly, if the DU 1002 also has the technical feature of the DU 1004 or the DU 1005, the DU 1002 may be referred to as a second basic DU relative to the DU 1004, or the DU 1002 may be referred to as a first basic DU relative to the DU 1005.

Therefore, by analogy, the first basic DU may be one or more DUs, or the second basic DU may be one or more DUs, which is not specifically limited in this embodiment of the disclosure.

It should be noted that "first" in the first data packet does not have any special meaning, and is merely used to differentiate from a "second" data packet and a "third" data packet in this embodiment of the disclosure to indicate a data packet of a different baseband.

A person of ordinary skill in the art may understand that, because a baseband is processed according to layers, that the first data packet and the second data packet are of the same data type represents, in essence, that the first data packet and the second data packet are data packets of a same sublayer of different basebands. That is, for example, in FIG. 10, if the DU 1004 is the first basic DU, the DU 1005 is the second basic DU, and the first data packet is a data packet sent by an L2 processing submodule of the DU 1004 to the switching device, the second data packet should be a data packet sent by an L2 processing submodule of the DU 1005 to the switching device.

The data type of the data packet may include:

L2 scheduling data, hard bit data, frequency-domain IQ data, and time-domain IQ data.

1902. The switching device receives a third data packet sent by a third basic DU.

This embodiment of the disclosure does not specifically limit the number of the third basic DUs, where there may be one or more third basic DUs, and all basic DUs having a technical feature of the third basic DU in this embodiment of the disclosure may be referred to as third basic DUs.

For example, in FIG. 10, the third basic DU may be the DU 1001, the DU 1002, or the DU 1001 and the DU 1002.

It should be noted that there is no necessary sequence for step 1901 and step 1902. Any one step of the steps may be performed first or the steps may be performed at the same time, which is not specifically limited in this embodiment of the disclosure.

1903. The switching device determines to send the first data packet and the second data packet to a second extended DU for collaborative processing.

Specifically, after receiving the first data packet sent by the first basic DU and receiving the second data packet sent by the second basic DU, the switching device may determine, according to a data routing policy, a bandwidth requirement of a transmission network, and a baseband processing capability of a DU, to send the first data packet and the second data packet to the second extended DU for processing, which is not specifically limited in this embodiment of the disclosure.

1904. The switching device sends the first data packet and the second data packet to the second extended DU, so that the second extended DU performs collaborative processing on the first data packet and the second data packet.

For example, in FIG. 10, if the switching device determines to send a first data packet sent by the DU 1004 and a second data packet sent by the DU 1005 to the DU 1009 for collaborative processing, the switching device sends the first data packet and the second data packet to the DU 1009, so that the DU 1009 performs collaborative processing on the first data packet and the second data packet.

It should be noted that the second extended DU may be one extended DU or a plurality of extended DUs, which is not specifically limited in this embodiment of the disclosure. All extended DUs having a technical feature of the second extended DU in this embodiment of the disclosure may be deemed as second extended DUs.

1905. The switching device receives a first signal sent by the second extended DU.

Specifically, the radio access system 1000 shown in FIG. 10 is different from the radio access system 300 shown in FIG. 3, where a signal in the system 300 is directly sent to a core network by using a transmission network, but a signal in the system 1000 is sent to the switching device by using a transmission network, and then sent by the switching device to a core network; therefore, relative to the radio access method shown in FIG. 15, in the radio access method provided in this embodiment, the switching device, after sending the first data packet and the second data packet to the second extended DU so that the second extended DU performs collaborative processing on the first data packet and the second data packet, further receives the first signal sent by the second extended DU.

It should be noted that "first" in the first signal does not have any special meaning, and is merely used to differentiate from a "second" signal and a "third" signal in the following.

For a reason why the switching device in this embodiment of the disclosure further receives the first signal sent by the second basic DU, reference may be made to a description of step 604 in the radio access method shown in FIG. 6, which is not repeated in this embodiment of the disclosure.

1906. The switching device sends the first signal.

1907. The switching device determines to send the third data packet to a first extended DU for processing.

Specifically, after receiving the third data packet sent by the third basic DU, the switching device may determine, according to a data routing policy, a bandwidth requirement of a transmission network, and a baseband processing capability of a DU, to send the third data packet to the first extended DU for processing, which is not specifically limited in this embodiment of the disclosure.

For example, in FIG. 10, if a baseband processing capability of the DU 1003 is limited, it may be determined that a baseband processing task in the DU 1003 is arranged to be processed in the DU 1008. In this case, the extended DU 1008 acts as a baseband resource pool of the basic DU 1003, and performs baseband processing in place of the basic DU 1003.

It should be noted that the first extended DU is an extended DU that acts as a baseband resource pool, where there may be one or more first extended DUs, which is not specifically limited in this embodiment of the disclosure.

1908. The switching device sends the third data packet to the first extended DU, so that the first extended DU processes the third data packet.

For example, in FIG. 10, if the switching device determines to send a third data packet sent by the DU 1003 to the DU 1008 for processing, the switching device sends the first data packet to the DU 1008.

1909. The switching device receives a second signal sent by the first extended DU.

Specifically, relative to the radio access method shown in FIG. 15, for a reason why the switching device in this embodiment of the disclosure further receives the second signal sent by the first extended DU after sending the third data packet to the first extended DU, reference may be made to a description of step 1905, which is not repeated in this embodiment of the disclosure.

1910. The switching device sends the second signal.

Certainly, in this embodiment of the disclosure, the first extended DU and the second extended DU may be the same extended DU. That is, one extended DU may perform baseband collaborative processing, and may act as a baseband resource pool at the same time, which is not specifically limited in this embodiment of the disclosure.

Based on the description of the foregoing embodiment, relative to positions of DUs in the conventional radio access network architecture, positions of basic DUs in the method are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the method are arranged in a distributed manner; therefore, disaster recovery may be implemented, so that the network architecture has high availability. In addition, the method may be used to implement baseband collaborative processing in a second extended DU, which may not only improve network performance, but also improve high availability of a system.

Moreover, a first extended DU may be used to act as a baseband resource pool of a basic DU, which further improves the high availability of the system.

The embodiments of the disclosure further provide apparatus and system embodiments for implementing the methods or steps in the foregoing method embodiments.

Embodiment 3

Figure 20:
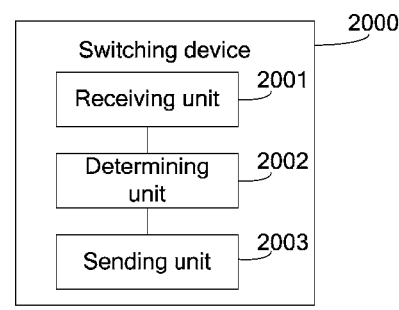
FIG. 20 is a switching device according to an embodiment of the disclosure.

This embodiment of the disclosure provides a switching device 2000. Specifically, as shown in FIG. 20, the switching device 2000 includes a receiving unit 2001, a determining unit 2002, and a sending unit 2003.

The receiving unit 2001 is configured to receive a first data packet sent by a first basic digital processing unit DU, and send the first data packet to the determining unit 2002, where the basic DU is deployed in a site.

The determining unit 2002 is configured to receive the first data packet sent by the receiving unit 2001, and after determining to send the first data packet to a second basic DU for collaborative processing, send the first data packet to the sending unit 2003.

The sending unit 2003 is configured to receive the first data packet sent by the determining unit 2002, and send the first data packet to the second basic DU, so that the second basic DU performs collaborative processing on the first data packet and a second data packet, where the second data packet and the first data packet are of a same data type.

Further, the receiving unit 2001 is further configured to receive a third data packet sent by a third basic DU, and send the third data packet to the determining unit 2002.

The determining unit 2002 is further configured to receive the third data packet sent by the receiving unit 2001, and after determining to send the third data packet to a first extended DU for processing, send the third data packet to the sending unit 2003, where the first extended DU is deployed together with the switching device 2000.

The sending unit 2003 is further configured to receive the third data packet sent by the receiving unit 2001, and send the third data packet to the first extended DU, so that the first extended DU processes the third data packet.

Further, the receiving unit 2001 is further configured to receive a fourth data packet sent by a fourth basic DU and a fifth data packet sent by a fifth basic DU, and send the fourth data packet and the fifth data packet to the determining unit 2002, where the fourth data packet and the fifth data packet are of a same data type.

The determining unit 2002 is further configured to receive the fourth data packet and the fifth data packet that are sent by the receiving unit 2001, and after determining to send the fourth data packet and the fifth data packet to a second extended DU for collaborative processing, send the fourth data packet and the fifth data packet to the sending unit 2003, where the second extended DU is deployed together with the switching device 2000.

The sending unit 2003 is further configured to receive the fourth data packet and the fifth data packet that are sent by the determining unit 2002, and send the fourth data packet and the fifth data packet to the second extended DU, so that the second extended DU performs collaborative processing on the fourth data packet and the fifth data packet.

Further, the data type of the data packet includes:

L2 scheduling data, hard bit data, frequency-domain IQ data, and time-domain IQ data.

Specifically, for a method for implementing radio access by using the switching device 2000, reference may be made to a description of Embodiment 1 or Embodiment 2, which is not repeated in this embodiment of the disclosure.

Based on the description of the foregoing embodiment, in a switching device, a receiving unit receives a first data packet sent by a first basic DU; and after a determining unit determines to send the first data packet to a second basic DU for collaborative processing, a sending unit sends the first data packet to the second basic DU, so that the second basic DU performs collaborative processing on the first data packet and a second data packet, which may implement mutual transmission and processing of collaborative data between sites, and then may improve network performance.

Embodiment 4

Figure 21:
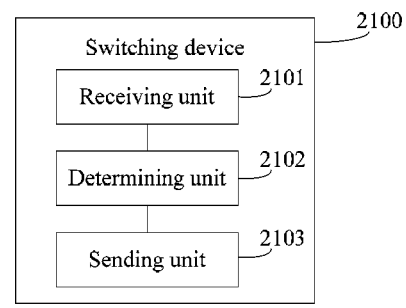
FIG. 21 is another switching device according to an embodiment of the disclosure.

This embodiment of the disclosure provides a switching device 2100. Specifically, as shown in FIG. 21, the switching device 2100 includes a receiving unit 2101, a determining unit 2102, and a sending unit 2103.

The receiving unit 2101 is configured to receive a first data packet sent by a first basic digital processing unit DU and a second data packet sent by a second basic DU, and send the first data packet and the second data packet to the determining unit 2102, where the basic DUs are deployed in a site.

The determining unit 2102 is configured to receive the first data packet and the second data packet that are sent by the receiving unit 2101, and after determining to send the first data packet and the second data packet to a second extended DU for collaborative processing, send the first data packet and the second data packet to the sending unit 2103, where the second extended DU is deployed together with the switching device 2100.

The sending unit 2103 is configured to receive the first data packet and the second data packet that are sent by the determining unit 2102, and send the first data packet and the second data packet to the second extended DU, so that the second extended DU performs collaborative processing on the first data packet and the second data packet.

Further, the receiving unit 2101 is further configured to receive a third data packet sent by a third basic DU, and send the third data packet to the determining unit 2102.

The determining unit 2102 is further configured to receive the third data packet sent by the receiving unit 2101, and after determining to send the third data packet to a first extended DU for processing, send the third data packet to the sending unit 2103, where the first extended DU is deployed together with the switching device 2100.

The sending unit 2103 is further configured to receive the third data packet sent by the receiving unit 2101, and send the third data packet to the first extended DU, so that the first extended DU processes the third data packet.

Further, the data type of the data packet includes:

L2 scheduling data, hard bit data, frequency-domain IQ data, and time-domain IQ data.

Specifically, for a method for implementing radio access by using the switching device 2100, reference may be made to a description of Embodiment 1 or Embodiment 2, which is not repeated in this embodiment of the disclosure.

Based on the description of the foregoing embodiment, in a switching device, a receiving unit receives a first data packet sent by a first basic DU and a second data packet sent by a second basic DU; and after a determining unit determines to send the first data packet and the second data packet to a second extended DU for collaborative processing, a sending unit sends the first data packet and the second data packet to the second extended DU, so that the second extended DU performs collaborative processing on the first data packet and the second data packet, which may implement mutual transmission and processing of collaborative data between sites, and then may improve network performance.

Embodiment 5

Figure 22:
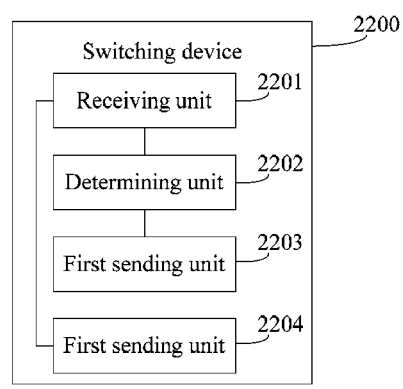
FIG. 22 is still another switching device according to an embodiment of the disclosure.

This embodiment of the disclosure provides a switching device 2200. Specifically, as shown in FIG. 22, the switching device 2200 includes a receiving unit 2201, a determining unit 2202, a first sending unit 2203, and a second sending unit 2204.

The receiving unit 2201 is configured to receive a first data packet sent by a first basic digital processing unit DU, and send the first data packet to the determining unit 2202, where the basic DU is deployed in a site.

The determining unit 2202 is configured to receive the first data packet sent by the receiving unit 2201, and after determining to send the first data packet to a second basic DU for collaborative processing, send the first data packet to the first sending unit 2203.

The first sending unit 2203 is configured to receive the first data packet sent by the determining unit 2202, and send the first data packet to the second basic DU, so that the second basic DU performs collaborative processing on the first data packet and a second data packet, where the second data packet and the first data packet are of a same data type.

The receiving unit 2201 is further configured to receive a first signal sent by the second basic DU, and send the first signal to the second sending unit 2204.

The second sending unit 2204 is configured to receive the first signal sent by the receiving unit 2201, and send the first signal.

Further, the receiving unit 2201 is further configured to receive a third data packet sent by a third basic DU, and send the third data packet to the determining unit 2202.

The determining unit 2202 is configured to receive the third data packet sent by the receiving unit 2201, and after determining to send the third data packet to a first extended DU for processing, send the third data packet to the first sending unit 2203, where the first extended DU is deployed together with the switching device 2200.

The first sending unit 2203 is further configured to receive the third data packet sent by the determining unit 2202, and send the third data packet to the first extended DU, so that the first extended DU processes the third data packet.

The receiving unit 2201 is further configured to receive a second signal sent by the first extended DU, and send the second signal to the second sending unit 2204.

The second sending unit 2204 is configured to receive the second signal sent by the receiving unit 2201, and send the second signal.

Further, the receiving unit 2201 is further configured to receive a fourth data packet sent by a fourth basic DU and a fifth data packet sent by a fifth basic DU, and send the fourth data packet and the fifth data packet to the determining unit 2202, where the fourth data packet and the fifth data packet are of a same data type.

The determining unit 2202 is further configured to receive the fourth data packet and the fifth data packet that are sent by the receiving unit 2201, and after determining to send the fourth data packet and the fifth data packet to a second extended DU for collaborative processing, send the fourth data packet and the fifth data packet to the first sending unit 2203, where the second extended DU is deployed together with the switching device 2200.

The first sending unit 2203 is further configured to receive the fourth data packet and the fifth data packet that are sent by the determining unit 2202, and send the fourth data packet and the fifth data packet to the second extended DU, so that the second extended DU performs collaborative processing on the fourth data packet and the fifth data packet.

The receiving unit 2201 is further configured to receive a third signal sent by the second extended DU, and send the third signal to the second sending unit 2204.

The second sending unit 2204 is configured to receive the third signal sent by the receiving unit 2201, and send the third signal.

Further, the data type of the data packet includes:

L2 scheduling data, hard bit data, frequency-domain IQ data, and time-domain IQ data.

Specifically, for a method for implementing radio access by using the switching device 2200, reference may be made to a description of Embodiment 1 or Embodiment 2, which is not repeated in this embodiment of the disclosure.

Based on the description of the foregoing embodiment, in a switching device, a receiving unit receives a first data packet sent by a first basic DU; after a determining unit determines to send the first data packet to a second basic DU for collaborative processing, a first sending unit sends the first data packet to the second basic DU, so that the second basic DU performs collaborative processing on the first data packet and a second data packet; the receiving unit further receives a first signal sent by the second basic DU; and a second sending unit sends the first signal, which may implement mutual transmission and processing of collaborative data between sites, and then may improve network performance.

Embodiment 6

Figure 23:
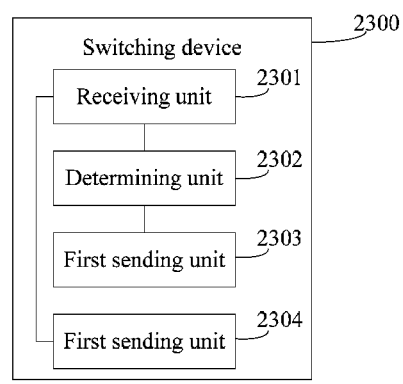
FIG. 23 is still another switching device according to an embodiment of the disclosure.

This embodiment of the disclosure provides a switching device 2300. Specifically, as shown in FIG. 23, the switching device 2300 includes a receiving unit 2301, a determining unit 2302, a first sending unit 2303, and a second sending unit 2304.

The receiving unit 2301 is configured to receive a first data packet sent by a first basic digital processing unit DU and a second data packet sent by a second basic DU, and send the first data packet and the second data packet to the determining unit 2302, where the basic DUs are deployed in a site.

The determining unit 2302 is configured to receive the first data packet and the second data packet that are sent by the receiving unit 2301, and after determining to send the first data packet and the second data packet to a second extended DU for collaborative processing, send the first data packet and the second data packet to the first sending unit 2303, where the second extended DU is deployed together with the switching device 2300.

The first sending unit 2303 is configured to receive the first data packet and the second data packet that are sent by the determining unit 2302, and send the first data packet and the second data packet to the second extended DU, so that the second extended DU performs collaborative processing on the first data packet and the second data packet.

The receiving unit 2301 is further configured to receive a first signal sent by the second extended DU, and send the first signal to the second sending unit 2304.

The second sending unit 2304 is configured to receive the first signal sent by the receiving unit 2301, and send the first signal.

Further, the receiving unit 2301 is further configured to receive a third data packet sent by a third basic DU, and send the third data packet to the determining unit 2302.

The determining unit 2302 is further configured to receive the third data packet sent by the receiving unit 2301, and after determining to send the third data packet to a first extended DU for processing, send the third data packet to the first sending unit 2303, where the first extended DU is deployed together with the switching device 2300.

The first sending unit 2303 is further configured to receive the third data packet sent by the receiving unit 2301, and send the third data packet to the first extended DU, so that the first extended DU processes the third data packet.

The receiving unit 2301 is further configured to receive a second signal sent by the first extended DU, and send the second signal to the second sending unit 2304.

The second sending unit 2304 is configured to receive the second signal sent by the receiving unit 2301, and send the second signal.

Further, the data type of the data packet includes:

L2 scheduling data, hard bit data, frequency-domain IQ data, and time-domain IQ data.

Specifically, for a method for implementing radio access by using the switching device 2300, reference may be made to a description of Embodiment 1 or Embodiment 2, which is not repeated in this embodiment of the disclosure.

Based on the description of the foregoing embodiment, in a switching device, a receiving unit receives a first data packet sent by a first basic DU and a second data packet sent by a second basic DU, after a determining unit determines to send the first data packet and the second data packet to a second extended DU for collaborative processing, a first sending unit sends the first data packet and the second data packet to the second extended DU, so that the second extended DU performs collaborative processing on the first data packet and the second data packet; the receiving unit further receives a first signal sent by the first extended DU; and a second sending unit sends the first signal, which may implement mutual transmission and processing of collaborative data between sites, and then may improve network performance.

Embodiment 7

This embodiment of the disclosure provides a switching device 2400.

Figure 24:
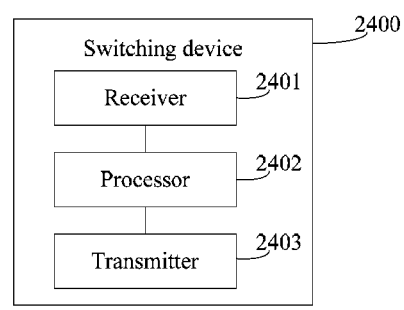
FIG. 24 is still another switching device according to an embodiment of the disclosure.

Specifically, as shown in FIG. 24, the switching device 2400 includes a receiver 2401, a processor 2402, and a transmitter 2403.

The receiver 2401 is configured to receive a first data packet sent by a first basic digital processing unit DU, and send the first data packet to the processor 2402, where the basic DU is deployed in a site.

The processor 2402 is configured to receive the first data packet sent by the receiver 2401, and after determining to send the first data packet to a second basic DU for collaborative processing, send the first data packet to the transmitter 2403.

The transmitter 2403 is configured to receive the first data packet sent by the processor 2402, and send the first data packet to the second basic DU, so that the second basic DU performs collaborative processing on the first data packet and a second data packet, where the second data packet and the first data packet are of a same data type.

Further, the receiver 2401 is further configured to receive a third data packet sent by a third basic DU, and send the third data packet to the processor 2402.

The processor 2402 is further configured to receive the third data packet sent by the receiver 2401, and after determining to send the third data packet to a first extended DU for processing, send the third data packet to the transmitter 2403, where the first extended DU is deployed together with the switching device 2400.

The transmitter 2403 is further configured to receive the third data packet sent by the receiver 2401, and send the third data packet to the first extended DU, so that the first extended DU processes the third data packet.

Further, the receiver 2401 is further configured to receive a fourth data packet sent by a fourth basic DU and a fifth data packet sent by a fifth basic DU, and send the fourth data packet and the fifth data packet to the processor 2402, where the fourth data packet and the fifth data packet are of a same data type.

The processor 2402 is further configured to receive the fourth data packet and the fifth data packet that are sent by the receiver 2401, and after determining to send the fourth data packet and the fifth data packet to a second extended DU for collaborative processing, send the fourth data packet and the fifth data packet to the transmitter 2403, where the second extended DU is deployed together with the switching device 2400.

The transmitter 2403 is further configured to receive the fourth data packet and the fifth data packet that are sent by the processor 2402, and send the fourth data packet and the fifth data packet to the second extended DU, so that the second extended DU performs collaborative processing on the fourth data packet and the fifth data packet.

Further, the data type of the data packet includes:

L2 scheduling data, hard bit data, frequency-domain IQ data, and time-domain IQ data.

Specifically, for a method for implementing radio access by using the switching device 2400, reference may be made to a description of Embodiment 1 or Embodiment 2, which is not repeated in this embodiment of the disclosure.

Based on the description of the foregoing embodiment, in a switching device, a receiver receives a first data packet sent by a first basic DU; and after a processor determines to send the first data packet to a second basic DU for collaborative processing, a transmitter sends the first data packet to the second basic DU, so that the second basic DU performs collaborative processing on the first data packet and a second data packet, which may implement mutual transmission and processing of collaborative data between sites, and then may improve network performance.

Embodiment 8

This embodiment of the disclosure provides a switching device 2500.

Figure 25:
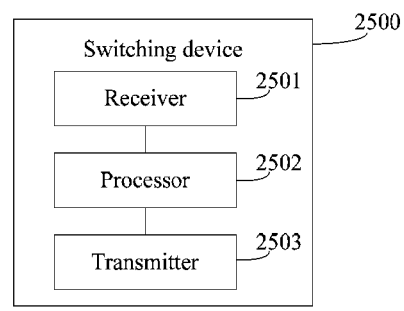
FIG. 25 is still another switching device according to an embodiment of the disclosure.

Specifically, as shown in FIG. 25, the switching device 2500 includes a receiver 2501, a processor 2502, and a transmitter 2503.

The receiver 2501 is configured to receive a first data packet sent by a first basic digital processing unit DU and a second data packet sent by a second basic DU, and send the first data packet and the second data packet to the processor 2502, where the basic DUs are deployed in a site.

The processor 2502 is configured to receive the first data packet and the second data packet that are sent by the receiver 2501, and after determining to send the first data packet and the second data packet to a second extended DU for collaborative processing, send the first data packet and the second data packet to the transmitter 2503, where the second extended DU is deployed together with the switching device 2500.

The transmitter 2503 is configured to receive the first data packet and the second data packet that are sent by the processor 2502, and send the first data packet and the second data packet to the second extended DU, so that the second extended DU performs collaborative processing on the first data packet and the second data packet.

Further, the receiver 2501 is further configured to receive a third data packet sent by a third basic DU, and send the third data packet to the processor 2502.

The processor 2502 is further configured to receive the third data packet sent by the receiver 2501, and after determining to send the third data packet to a first extended DU for processing, send the third data packet to the transmitter 2503, where the first extended DU is deployed together with the switching device 2500.

The transmitter 2503 is further configured to receive the third data packet sent by the receiver 2501, and send the third data packet to the first extended DU, so that the first extended DU processes the third data packet.

Further, the data type of the data packet includes:

L2 scheduling data, hard bit data, frequency-domain IQ data, and time-domain IQ data.

Specifically, for a method for implementing radio access by using the switching device 2500, reference may be made to a description of Embodiment 1 or Embodiment 2, which is not repeated in this embodiment of the disclosure.

Based on the description of the foregoing embodiment, in a switching device, a receiver receives a first data packet sent by a first basic DU and a second data packet sent by a second basic DU; and after a processor determines to send the first data packet and the second data packet to a second extended DU for collaborative processing, a transmitter sends the first data packet and the second data packet to the second extended DU, so that the second extended DU performs collaborative processing on the first data packet and the second data packet, which may implement mutual transmission and processing of collaborative data between sites, and then may improve network performance.

Embodiment 9

Figure 26:
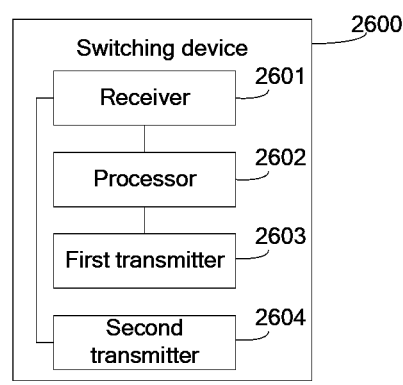
FIG. 26 is still another switching device according to an embodiment of the disclosure.

This embodiment of the disclosure provides a switching device 2600. Specifically, as shown in FIG. 26, the switching device 2600 includes a receiver 2601, a processor 2602, a first transmitter 2603, and a second transmitter 2604.

The receiver 2601 is configured to receive a first data packet sent by a first basic digital processing unit DU, and send the first data packet to the processor 2602, where the basic DU is deployed in a site.

The processor 2602 is configured to receive the first data packet sent by the receiver 2601, and after determining to send the first data packet to a second basic DU for collaborative processing, send the first data packet to the first transmitter 2603.

The first transmitter 2603 is configured to receive the first data packet sent by the processor 2602, and send the first data packet to the second basic DU, so that the second basic DU performs collaborative processing on the first data packet and a second data packet, where the second data packet and the first data packet are of a same data type.

The receiver 2601 is further configured to receive a first signal sent by the second basic DU, and send the first signal to the second transmitter 2604.

The second transmitter 2604 is configured to receive the first signal sent by the receiver 2601, and send the first signal.

Further, the receiver 2601 is further configured to receive a third data packet sent by a third basic DU, and send the third data packet to the processor 2602.

The processor 2602 is configured to receive the third data packet sent by the receiver 2601, and after determining to send the third data packet to a first extended DU for processing, send the third data packet to the first transmitter 2603, where the first extended DU is deployed together with the switching device 2600.

The first transmitter 2603 is further configured to receive the third data packet sent by the processor 2602, and send the third data packet to the first extended DU, so that the first extended DU processes the third data packet.

The receiver 2601 is further configured to receive a second signal sent by the first extended DU, and send the second signal to the second transmitter 2604.

The second transmitter 2604 is configured to receive the second signal sent by the receiver 2601, and send the second signal.

Further, the receiver 2601 is further configured to receive a fourth data packet sent by a fourth basic DU and a fifth data packet sent by a fifth basic DU, and send the fourth data packet and the fifth data packet to the processor 2602, where the fourth data packet and the fifth data packet are of a same data type.

The processor 2602 is further configured to receive the fourth data packet and the fifth data packet that are sent by the receiver 2601, and after determining to send the fourth data packet and the fifth data packet to a second extended DU for collaborative processing, send the fourth data packet and the fifth data packet to the first transmitter 2603, where the second extended DU is deployed together with the switching device 2600.

The first transmitter 2603 is further configured to receive the fourth data packet and the fifth data packet that are sent by the processor 2602, and send the fourth data packet and the fifth data packet to the second extended DU, so that the second extended DU performs collaborative processing on the fourth data packet and the fifth data packet.

The receiver 2601 is further configured to receive a third signal sent by the second extended DU, and send the third signal to the second transmitter 2604.

The second transmitter 2604 is configured to receive the third signal sent by the receiver 2601, and send the third signal.

Further, the data type of the data packet includes:

L2 scheduling data, hard bit data, frequency-domain IQ data, and time-domain IQ data.

Specifically, for a method for implementing radio access by using the switching device 2600, reference may be made to a description of Embodiment 1 or Embodiment 2, which is not repeated in this embodiment of the disclosure.

Based on the description of the foregoing embodiment, in a switching device, a receiver receives a first data packet sent by a first basic DU; after a processor determines to send the first data packet to a second basic DU for collaborative processing, a first transmitter sends the first data packet to the second basic DU, so that the second basic DU performs collaborative processing on the first data packet and a second data packet; the receiver further receives a first signal sent by the second basic DU; and a second transmitter sends the first signal, which may implement mutual transmission and processing of collaborative data between sites, and then may improve network performance.

Embodiment 10

Figure 27:
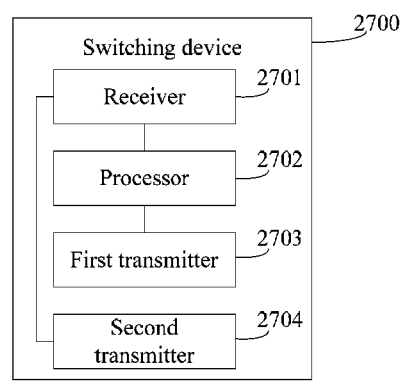
FIG. 27 is still another switching device according to an embodiment of the disclosure.

This embodiment of the disclosure provides a switching device 2700. Specifically, as shown in FIG. 27, the switching device 2700 includes a receiver 2701, a processor 2702, a first transmitter 2703, and a second transmitter 2704.

The receiver 2701 is configured to receive a first data packet sent by a first basic digital processing unit DU and a second data packet sent by a second basic DU, and send the first data packet and the second data packet to the processor 2702, where the basic DUs are deployed in a site.

The processor 2702 is configured to receive the first data packet and the second data packet that are sent by the receiver 2701, and after determining to send the first data packet and the second data packet to a second extended DU for collaborative processing, send the first data packet and the second data packet to the first transmitter 2703, where the second extended DU is deployed together with the switching device 2700.

The first transmitter 2703 is configured to receive the first data packet and the second data packet that are sent by the processor 2702, and send the first data packet and the second data packet to the second extended DU, so that the second extended DU performs collaborative processing on the first data packet and the second data packet.

The receiver 2701 is further configured to receive a first signal sent by the second extended DU, and send the first signal to the second transmitter 2704.

The second transmitter 2704 is configured to receive the first signal sent by the receiver 2701, and send the first signal.

Further, the receiver 2701 is further configured to receive a third data packet sent by a third basic DU, and send the third data packet to the processor 2702.

The processor 2702 is further configured to receive the third data packet sent by the receiver 2701, and after determining to send the third data packet to a first extended DU for processing, send the third data packet to the first transmitter 2703, where the first extended DU is deployed together with the switching device 2700.

The first transmitter 2703 is further configured to receive the third data packet sent by the receiver 2701, and send the third data packet to the first extended DU, so that the first extended DU processes the third data packet.

The receiver 2701 is further configured to receive a second signal sent by the first extended DU, and send the second signal to the second transmitter 2704.

The second transmitter 2704 is configured to receive the second signal sent by the receiver 2701, and send the second signal.

Further, the data type of the data packet includes:

L2 scheduling data, hard bit data, frequency-domain IQ data, and time-domain IQ data.

Specifically, for a method for implementing radio access by using the switching device 2700, reference may be made to a description of Embodiment 1 or Embodiment 2, which is not repeated in this embodiment of the disclosure.

Based on the description of the foregoing embodiment, in a switching device, a receiver receives a first data packet sent by a first basic DU and a second data packet sent by a second basic DU; after a processor determines to send the first data packet and the second data packet to a second extended DU for collaborative processing, a first transmitter sends the first data packet and the second data packet to the second extended DU, so that the second extended DU performs collaborative processing on the first data packet and the second data packet; the receiver further receives a first signal sent by the first extended DU; and a second transmitter sends the first signal, which may implement mutual transmission and processing of collaborative data between sites, and then may improve network performance.

Embodiment 11

This embodiment of the disclosure provides a digital processing unit DU 700. Specifically, as shown in FIG. 7, the DU 700 is classified into a basic DU and an extended DU, where the basic DU is a DU deployed in a site, and the extended DU is a DU deployed together with a switching device, and the DU includes:

an L1 processing module 701, an L2 processing module 702, an L3 processing module 703, a first interface 704, and a second interface 705.

The L1 processing module 701 is connected to a radio frequency processing unit RU and the L2 processing module 702 separately, the L2 processing module 702 is connected to the L3 processing module 703, the L3 processing module 703 is connected to the first interface 704, the L1 processing module 701 is further connected to the second interface 705, the L2 processing module 702 is further connected to the second interface 705, and the second interface 705 is further connected to the RU.

The first interface 704 is configured to receive and send a signal.

The second interface 705 is configured to receive and send a data packet.

Specifically, two different manners in which the DU 700 is connected to the switching device are shown in FIG. 8 or FIG. 9, and are not repeated in this embodiment of the disclosure.

It should be noted that the first interface and the second interface are merely logical interfaces. For details, reference may be made to a description of step 604 in Embodiment 1, which is not repeated in this embodiment of the disclosure.

Specifically, the L1 processing module 701 may include at least one L1 processing submodule, and the L2 processing module includes at least one L2 processing submodule.

The L1 processing module 701 being connected to the second interface 705 specifically includes:

each L1 processing submodule of the at least one L1 processing submodule being connected to the second interface separately.

The L2 processing module being connected to the second interface specifically includes:

each L2 processing submodule of the at least one L2 processing submodule being connected to the second interface separately.

For example, a schematic apparatus diagram of interface division of a DU is provided herein. Specifically, as shown in FIG. 28, the DU 700 includes an L1 first processing submodule 7010, an L1 second processing submodule 7011, an L2 processing module 702, an L3 processing module 703, a first interface 704, and a second interface 705.

Figure 28:
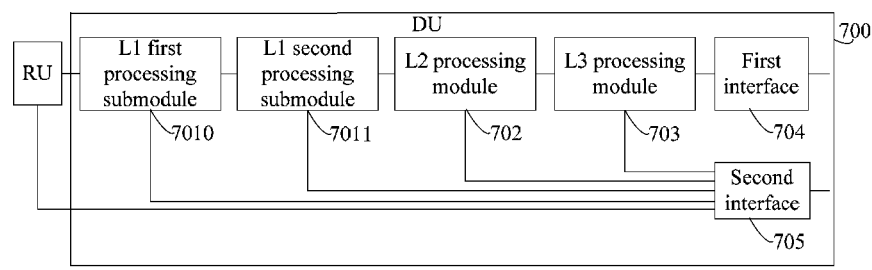
FIG. 28 is a schematic apparatus diagram of interface division of a DU according to an embodiment of the disclosure.
Figure 29:
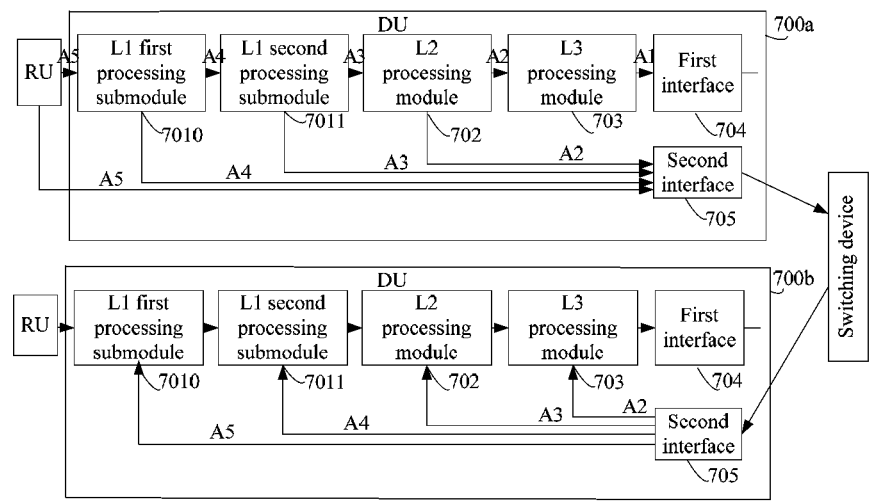
FIG. 29 is a schematic diagram of a data flow direction for performing baseband collaborative processing according to an embodiment of the disclosure.
Figure 30:
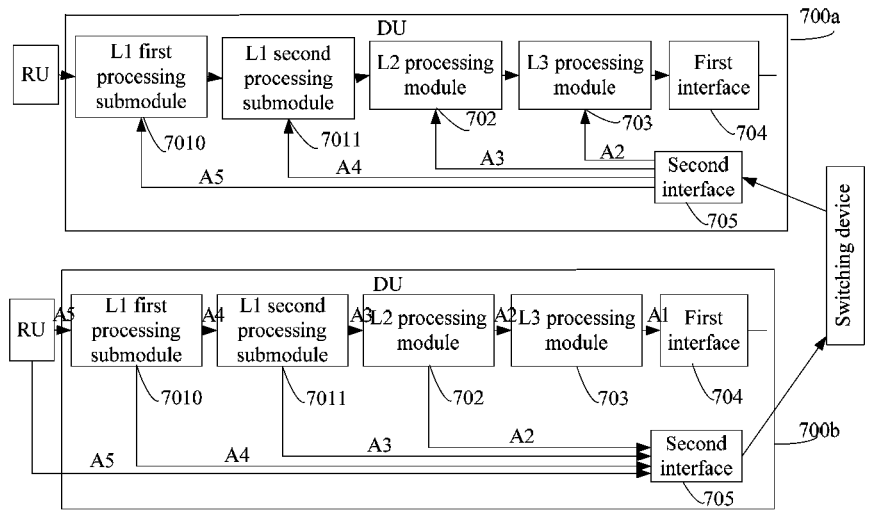
FIG. 30 is a schematic diagram of another data flow direction for performing baseband collaborative processing according to an embodiment of the disclosure.

In a case of specific interface division shown in FIG. 28, with reference to a connection relationship between the DU and the switching device shown in FIG. 8, a schematic diagram of a data flow direction for performing baseband collaborative processing is provided, specifically, as shown in FIG. 29 and FIG. 30, where two DUs 700, which are a DU 700a and a DU 700b, are included in FIG. 29 and FIG. 30 separately. It is assumed that: the DU 700a in FIG. 29 does not perform baseband collaborative processing, the DU 700b performs collaborative processing on a baseband of the DU 700a, the DU 700b in FIG. 30 does not perform baseband collaborative processing, and the DU 700a performs collaborative processing on a baseband of the DU 700b. A flow direction of a data packet is shown as an arrow in the figures. Details are not repeated herein.

A5 represents time-domain IQ data, A4 represents frequency-domain IQ data, A3 represents hard bit data, A2 represents L2 scheduling data, and A1 represents a signal.

As may be seen from FIG. 29 and FIG. 30, for the DU 700a or the DU 700b, when the DU performs baseband collaborative processing and when the DU does not perform baseband collaborative processing, data flow directions are obviously different; moreover, when the DU performs baseband collaborative processing and when the DU does not perform baseband collaborative processing, types of data transmitted between a same processing module and the second interface are different either. For example, for the DU 700a, in FIG. 29, a type of data transmitted between the L2 processing module and the second interface is A2; but in FIG. 30, a type of data transmitted between the L2 processing module and the second interface is A3.

Figure 31:
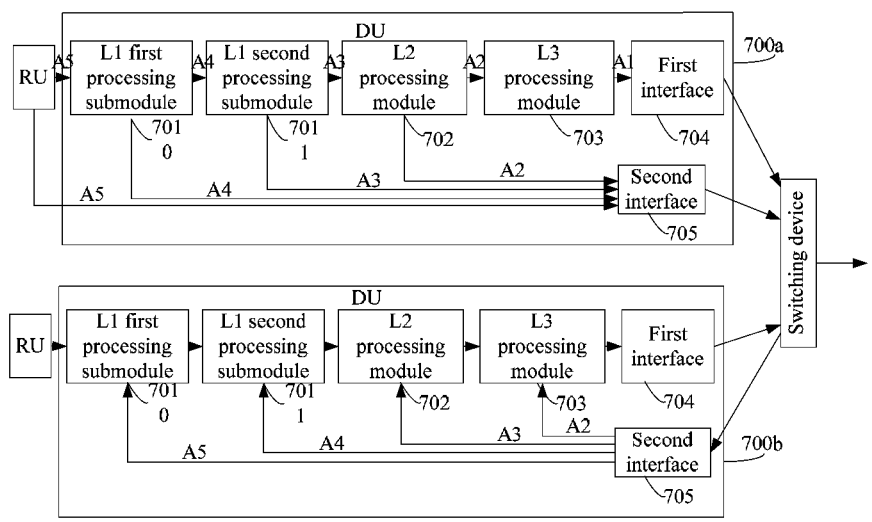
FIG. 31 is a schematic diagram of still another data flow direction for performing baseband collaborative processing according to an embodiment of the disclosure.
Figure 32:
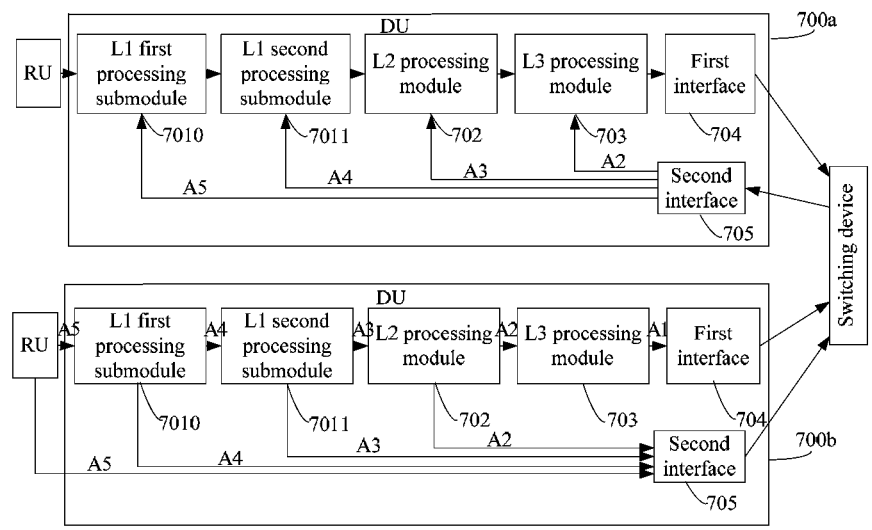
FIG. 32 is a schematic diagram of still another data flow direction for performing baseband collaborative processing according to an embodiment of the disclosure.

In a case of the specific interface division shown in FIG. 28, with reference to a connection relationship between the DU and the switching device shown in FIG. 9, a schematic diagram of a data flow direction may be provided, as shown in FIG. 31 and FIG. 32, and details are not repeated in this embodiment of the disclosure.

Certainly, according to a different interface data requirement, there may be another interface division method, which is not specifically limited in this embodiment of the disclosure.

Based on the description of the foregoing embodiment, a digital processing unit DU provided in this embodiment of the disclosure may cooperate with the switching device according to any one of Embodiment 3 to Embodiment 10 to implement mutual transmission and processing of collaborative data between sites, which may improve network performance.

Embodiment 12

This embodiment of the disclosure provides a radio access system, where the system includes:

a radio frequency processing unit RU, the basic DU according to Embodiment 11, a transmission network, and the switching device according to Embodiment 3 that has no interaction with an extended DU.

A second interface of the basic DU is connected to the switching device, and the basic DU interacts with the switching device by using the transmission network.

It should be noted that the second interface is a logical interface. For details, reference may be made to a description of step 604 in Embodiment 1, which is not repeated in this embodiment of the disclosure.

It should be noted that, in order to achieve baseband collaborative processing between sites, there are at least two basic DUs in the radio access system, where there may be two or more basic DUs, and the specific number is not limited.

For example, when the radio access system includes three basic DUs, a radio access system in an LTE network may be shown in FIG. 1, where a connection relationship between a DU in FIG. 1 and a switching device is shown in FIG. 8.

Further, in a radio access system, in order to implement large-capacity switching, the switching device may include n-stage switches, where n≥2.

Figure 33:
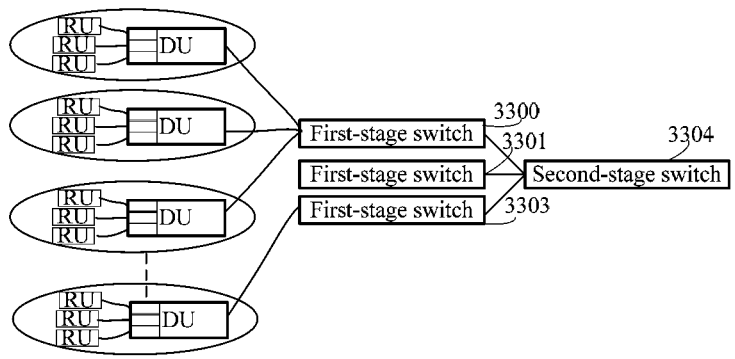
FIG. 33 is a schematic distribution diagram of multi-stage switches and basic DUs according to an embodiment of the disclosure.

For example, as shown in FIG. 33, the switching device is formed by three first-stage switches and one second-stage switch 3304, where the three first-stage switches are connected to basic DUs, and the three first-stage switches are a first-stage switch 3300, a first-stage switch 3301, and a first-stage switch 3302.

During mutual transmission of collaborative data between sites, if two basic DUs that are connected to different first-stage switches need to perform baseband collaborative processing, a transmitted data packet needs to go through the second-stage switch 3304; if two basic DUs that are connected to a same first-stage switch need to perform baseband collaborative processing, a transmitted data packet does not need to go through the second-stage switch 3304.

Specially, multi-stage switches may be deployed in a distributed manner a first distance exists between a first-stage switch of the n-stage switches and the basic DU, and a second distance exists between an $n^{th}$-stage switch of the n-stage switches and the basic DU, where the first distance is smaller than the second distance.

Figure 34:
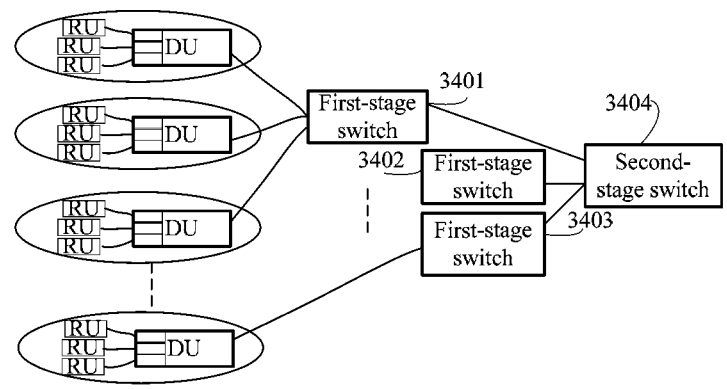
FIG. 34 is a schematic distribution diagram of multi-stage switches and basic DUs according to an embodiment of the disclosure.

For example, as shown in FIG. 34, the switching device is formed by three first-stage switches and one second-stage switch 3404, where the three first-stage switches are connected to basic DUs; the three first-stage switches are a first-stage switch 3400, a first-stage switch 3401, and a first-stage switch 3402; and the first-stage switch 3401 is deployed near a site.

During mutual transmission of collaborative data between sites, if two basic DUs that are connected to the first-stage 3401 need to perform baseband collaborative processing, because a transmitted data packet may be mutually transmitted merely in the first-stage 3401 near the site, a switching delay is low, and a speed of baseband collaborative processing is high, which may improve network performance. In addition, because the first-stage switch 3401 is deployed near the site, an optical fiber may be saved.

Figure 35:
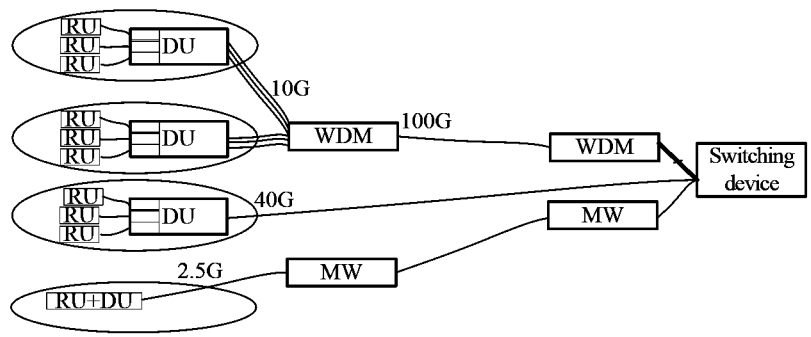
FIG. 35 is a schematic diagram of hybrid transmission networking according to an embodiment of the disclosure.

For transmission of the transmission network, this embodiment of the disclosure gives a schematic diagram of hybrid transmission networking. Specifically, as shown in FIG. 35, a basic DU of a site may multiplex a plurality of signals to a pair of optical fibers in a wavelength division manner by using an external wavelength division multiplexing (Wavelength Division Multiplexing, WDM) device, and may also combine a plurality of signals to a pair of optical fibers for transmission by using an internal quad SFP interface (Quad Small Form-factor Pluggable, QSFP) optical module; for a low-speed interface signal of a small base station, the signal may further be transmitted to a switching unit by using an external microwave (microwave, MW). In addition, an interface rate in the transmission network may be configured, so as to improve access adaptability of a conventional site. For example, some sites may obtain an optical fiber easily; in this case, a transmission rate may be configured as 10G/25G/40G/100G. Some sites cannot obtain an optical fiber, for example, a microwave is used; in this case, a transmission rate may be configured as a low rate, for example, 2.5G/5G/10G. Supporting of mixed transmission rates may be implemented by flexible data configuration.

A part related to the transmission network is content that may be implemented in the prior art; therefore, this embodiment of the disclosure does not describe this part in detail, but merely provides an exemplary implementation solution, so that an entire radio access system can implement radio access.

With reference to the foregoing description, an example for performing radio access in the radio access system is provided herein as follows:

In the radio access system 100 shown in FIG. 1, when a terminal user 1 makes a phone call on a mobile phone in a site in which the DU 102 is located, a mobile phone signal may be received by both an antenna near the DU 101 and an antenna near the DU 102. If no other terminal user makes a phone call on a mobile phone at the moment, it is determined, according to a data routing policy, that baseband collaborative processing is to be performed in the DU 102. Accordingly, although the antenna near the DU 101 receives the mobile phone signal, no baseband processing is performed; instead, a data packet is sent to a switching device, so that the switching device sends the data packet to the DU 102, and baseband collaborative processing is performed in the DU 102. Reference may be made to FIG. 29 for understanding a flow direction of the data packet in this process, where 700a in FIG. 29 may be deemed as the DU 101, and 700b may be deemed as the DU 102. Eventually, a first interface of the DU 102 sends an S1 signal to a core network and sends an X2 signal to another base station, thereby completing radio access in a call process.

Based on the radio access system provided in this embodiment of the disclosure, relative to positions of DUs in the conventional radio access network architecture, positions of basic DUs in the system are not changed, where the basic DUs are still deployed in a site; therefore, a deployment cost is lower than that of the conventional C-RAN architecture. Moreover, relative to the positions of the DUs in the C-RAN access network architecture, the positions of the basic DUs in the system are arranged in a distributed manner; therefore, disaster recovery may be implemented, so that the network architecture has high availability. In addition, the system may be used to implement baseband collaborative processing in the basic DUs, which may improve network performance. Moreover, the system may further support any one standard of a multi-mode radio frequency module of a multi-mode site to independently perform baseband collaborative processing, and may further support access of base stations in a plurality of forms, for example, a distributed base station, a conventional macro base station, and a micro base station.

Embodiment 13

This embodiment of the disclosure provides a radio access system, where the system includes:

a radio frequency processing unit RU, the basic DU according to Embodiment 11, the extended DU according to Embodiment 11, a transmission network, and the switching device according to Embodiment 4 or the switching device according to Embodiment 3 that interacts with the extended DU.

A second interface of the basic DU is connected to the switching device, a second interface of the extended DU is connected to the switching device, and the basic DU and the extended DU interact with the switching device by using the transmission network.

It should be noted that the second interface is a logical interface. For details, reference may be made to a description of step 604 in Embodiment 1, which is not repeated in this embodiment of the disclosure.

It should be noted that, in order to achieve baseband collaborative processing between sites, there are at least two basic DUs in the radio access system, where there may be two or more basic DUs, and the specific number is not limited. In addition, the number of the extended DUs is not specifically limited either, where there may be one or more extended DUs, which is determined according to an actual requirement.

For example, when the radio access system includes five basic DUs and two extended DUs, a radio access system may be shown in FIG. 3, where a connection relationship between a DU in FIG. 3 and a switching device is shown in FIG. 8.

Further, in a radio access system, in order to implement large-capacity switching, the switching device may include n-stage switches, where n≥2.

For example, as shown in FIG. 33, the switching device is formed by three first-stage switches and one second-stage switch 3304, where the three first-stage switches are connected to basic DUs, and the three first-stage switches are a first-stage switch 3300, a first-stage switch 3301, and a first-stage switch 3302.

During mutual transmission of collaborative data between sites, if two basic DUs that are connected to different first-stage switches need to perform baseband collaborative processing, a transmitted data packet needs to go through the second-stage switch 3304; if two basic DUs that are connected to a same first-stage switch need to perform baseband collaborative processing, a transmitted data packet does not need to go through the second-stage switch 3304.

Specially, multi-stage switches may be deployed in a distributed manner a first distance exists between a first-stage switch of the n-stage switches and the basic DU, and a second distance exists between an $n^{th}$-stage switch of the n-stage switches and the basic DU, where the first distance is smaller than the second distance.

For example, as shown in FIG. 34, the switching device is formed by three first-stage switches and one second-stage switch 3404, where the three first-stage switches are connected to basic DUs; the three first-stage switches are a first-stage switch 3400, a first-stage switch 3401, and a first-stage switch 3402; and the first-stage switch 3401 is deployed near a site.

During mutual transmission of collaborative data between sites, if two basic DUs that are connected to the first-stage 3401 need to perform baseband collaborative processing, because a transmitted data packet may be mutually transmitted merely in the first-stage 3401 near the site, a switching delay is low, and a speed of baseband collaborative processing is high, which may improve network performance. In addition, because the first-stage switch 3401 is deployed near the site, an optical fiber may be saved.

For transmission of the transmission network, reference may be made to a description of Embodiment 13, which is not repeated in this embodiment of the disclosure.

With reference to the foregoing description, an example for performing radio access in the radio access system is provided herein as follows:

In the radio access system 300 shown in FIG. 3, when a terminal user 1 makes a phone call on a mobile phone in a site in which the DU 302 is located, a mobile phone signal may be received by both an antenna near the DU 301 and an antenna near the DU 302. If no other terminal user makes a phone call on a mobile phone at the moment, it is determined, according to a data routing policy, that baseband collaborative processing is to be performed in the DU 308. Accordingly, although the antennas near the DU 301 and the DU 302 receive the mobile phone signal, no baseband processing is performed; instead, a data packet is sent to a switching device, so that the switching device sends the data packet to the DU 308, and baseband collaborative processing is performed in the DU 308. Eventually, a first interface of the DU 308 sends an S1 signal to a core network and sends an X2 signal to another base station, thereby completing radio access in a call process.

Based on the radio access system provided in this embodiment of the disclosure, relative to positions of DUs in the conventional radio access network architecture, positions of basic DUs in the system are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the system are arranged in a distributed manner; therefore, disaster recovery may be implemented, so that the network architecture has high availability. In addition, the system may be used to implement baseband collaborative processing in the basic DUs, which improves network performance. Moreover, extended DUs are also deployed in the system, and baseband collaborative processing may be performed in the extended DUs, where an extended DU may further act as a baseband resource pool of a basic DU, so that a base station keeps obtaining a new feature, which prolongs a service life of a baseband of an early version, and improves high availability of the system. Moreover, it is unnecessary to go to a site during maintenance and capacity expansion, which reduces a cost. In addition, the system may further support any one standard of a multi-mode radio frequency module of a multi-mode site to independently perform baseband collaborative processing, and may further support access of base stations in a plurality of forms, for example, a distributed base station, a conventional macro base station, and a micro base station.

Embodiment 14

This embodiment of the disclosure provides a radio access system, where the system includes:

a radio frequency processing unit RU, the basic DU according to Embodiment 11, a transmission network, and the switching device according to Embodiment 5 that has no interaction with an extended DU.

A first interface and a second interface of the basic DU are both connected to the switching device, and the basic DU interacts with the switching device by using the transmission network.

It should be noted that both the first interface and the second interface are logical interfaces. For details, reference may be made to a description of step 604 in Embodiment 1, which is not repeated in this embodiment of the disclosure.

It should be noted that there are at least two basic DUs in the radio access system, where there may be two or more basic DUs, and the specific number is not limited in this embodiment of the disclosure.

For example, when the radio access system includes three basic DUs, a radio access system in an LTE network may be shown in FIG. 5, where a connection relationship between a DU in FIG. 5 and a switching device is shown in FIG. 9.

Further, in a radio access system, in order to implement large-capacity switching, the switching device may include n-stage switches, where n≥2.

For example, as shown in FIG. 33, the switching device is formed by three first-stage switches and one second-stage switch 3304, where the three first-stage switches are connected to basic DUs, and the three first-stage switches are a first-stage switch 3300, a first-stage switch 3301, and a first-stage switch 3302.

During mutual transmission of collaborative data between sites, if two basic DUs that are connected to different first-stage switches need to perform baseband collaborative processing, a transmitted data packet needs to go through the second-stage switch 3304; if two basic DUs that are connected to a same first-stage switch need to perform baseband collaborative processing, a transmitted data packet does not need to go through the second-stage switch 3304.

Specially, multi-stage switches may be deployed in a distributed manner a first distance exists between a first-stage switch of the n-stage switches and the basic DU, and a second distance exists between an $n^{th}$-stage switch of the n-stage switches and the basic DU, where the first distance is smaller than the second distance.

For example, as shown in FIG. 34, the switching device is formed by three first-stage switches and one second-stage switch 3404, where the three first-stage switches are connected to basic DUs; the three first-stage switches are a first-stage switch 3400, a first-stage switch 3401, and a first-stage switch 3402; and the first-stage switch 3401 is deployed near a site.

During mutual transmission of collaborative data between sites, if two basic DUs that are connected to the first-stage 3401 need to perform baseband collaborative processing, because a transmitted data packet may be mutually transmitted merely in the first-stage 3401 near the site, a switching delay is low, and a speed of baseband collaborative processing is high, which may improve network performance. In addition, because the first-stage switch 3401 is deployed near the site, an optical fiber may be saved.

For transmission of the transmission network, reference may be made to a description of Embodiment 13, which is not repeated in this embodiment of the disclosure.

In this embodiment of the disclosure, relative to the radio access system according to Embodiment 12, because the first interface and the second interface are both connected to the switching device, when the first interface and the second interface share a same physical interface, an optical fiber is saved in this embodiment of the disclosure, relative to the radio access system according to Embodiment 12.

With reference to the foregoing description, an example for performing radio access in the radio access system is provided herein as follows:

In the radio access system 500 shown in FIG. 5, when a terminal user 1 makes a phone call on a mobile phone in a site in which the DU 502 is located, a mobile phone signal may be received by both an antenna near the DU 501 and an antenna near the DU 502. If no other terminal user makes a phone call on a mobile phone at the moment, it is determined, according to a data routing policy, that baseband collaborative processing is to be performed in the DU 502. Accordingly, although the antenna near the DU 501 receives the mobile phone signal, no baseband processing is performed; instead, a data packet is sent to a switching device, so that the switching device sends the data packet to the DU 502, and baseband collaborative processing is performed in the DU 502. Reference may be made to FIG. 31 for understanding a flow direction of the data packet in this process, where 700*a* in FIG. 31 may be deemed as the DU 501, and 700*b* may be deemed as the DU 502. Eventually, a first interface of the DU 102 sends an S1/X2 signal to the switching device, and the switching device sends the S1 signal to a core network and sends the X2 signal to another base station, thereby completing radio access in a call process.

Based on the radio access system provided in this embodiment of the disclosure, relative to positions of DUs in the conventional radio access network architecture, positions of basic DUs in the system are not changed, where the basic DUs are still deployed in a site; therefore, a deployment cost is lower than that of the conventional C-RAN architecture. Moreover, relative to the positions of the DUs in the C-RAN access network architecture, the positions of the basic DUs in the system are arranged in a distributed manner; therefore, disaster recovery may be implemented, so that the network architecture has high availability. In addition, the system may be used to implement baseband collaborative processing in the basic DUs, which may improve network performance. Moreover, the system may further support any one standard of a multi-mode radio frequency module of a multi-mode site to independently perform baseband collaborative processing, and may further support access of base stations in a plurality of forms, for example, a distributed base station, a conventional macro base station, and a micro base station.

Embodiment 15

This embodiment of the disclosure provides a radio access system, where the system includes:

a radio frequency processing unit RU, the basic DU according to Embodiment 11, the extended DU according to Embodiment 11, a transmission network, and the switching device according to Embodiment 6 or the switching device according to Embodiment 5 that interacts with the extended DU.

A first interface and a second interface of the basic DU are both connected to the switching device, a first interface and a second interface of the extended DU are both connected to the switching device, and the basic DU and the extended DU interact with the switching device by using the transmission network.

It should be noted that both the first interface and the second interface are logical interfaces. For details, reference may be made to a description of step 604 in Embodiment 1, which is not repeated in this embodiment of the disclosure.

It should be noted that, in order to achieve baseband collaborative processing between sites, there are at least two basic DUs in the radio access system, where there may be two or more basic DUs, and the specific number is not limited. In addition, the number of the extended DUs is not specifically limited either, where there may be one or more extended DUs, which is determined according to an actual requirement.

For example, when the radio access system includes five basic DUs and two extended DUs, a radio access system may be shown in FIG. 10, where a connection relationship between a DU in FIG. 10 and a switching device is shown in FIG. 9.

Further, in a radio access system, in order to implement large-capacity switching, the switching device may include n-stage switches, where n≥2.

For example, as shown in FIG. 33, the switching device is formed by three first-stage switches and one second-stage switch 3304, where the three first-stage switches are connected to basic DUs, and the three first-stage switches are a first-stage switch 3300, a first-stage switch 3301, and a first-stage switch 3302.

During mutual transmission of collaborative data between sites, if two basic DUs that are connected to different first-stage switches need to perform baseband collaborative processing, a transmitted data packet needs to go through the second-stage switch 3304; if two basic DUs that are connected to a same first-stage switch need to perform baseband collaborative processing, a transmitted data packet does not need to go through the second-stage switch 3304.

Specially, multi-stage switches may be deployed in a distributed manner a first distance exists between a first-stage switch of the n-stage switches and the basic DU, and a second distance exists between an $n^{th}$-stage switch of the n-stage switches and the basic DU, where the first distance is smaller than the second distance.

For example, as shown in FIG. 34, the switching device is formed by three first-stage switches and one second-stage switch 3404, where the three first-stage switches are connected to basic DUs; the three first-stage switches are a first-stage switch 3400, a first-stage switch 3401, and a first-stage switch 3402; and the first-stage switch 3401 is deployed near a site.

During mutual transmission of collaborative data between sites, if two basic DUs that are connected to the first-stage 3401 need to perform baseband collaborative processing, because a transmitted data packet may be mutually transmitted merely in the first-stage 3401 near the site, a switching delay is low, and a speed of baseband collaborative processing is high, which may improve network performance. In addition, because the first-stage switch 3401 is deployed near the site, an optical fiber may be saved.

For transmission of the transmission network, reference may be made to a description of Embodiment 13, which is not repeated in this embodiment of the disclosure.

In this embodiment of the disclosure, relative to the radio access system according to Embodiment 13, because the first interface and the second interface are both connected to the switching device, when the first interface and the second interface share a same physical interface, an optical fiber is saved in this embodiment of the disclosure, relative to the radio access system according to Embodiment 13.

With reference to the foregoing description, an example for performing radio access in the radio access system is provided herein as follows:

In the radio access system 1000 shown in FIG. 10, when a terminal user 1 makes a phone call on a mobile phone in a site in which the DU 1002 is located, a mobile phone signal may be received by both an antenna near the DU 1001 and an antenna near the DU 1002. If no other terminal user makes a phone call on a mobile phone at the moment, it is determined, according to a data routing policy, that baseband collaborative processing is to be performed in the DU 1008. Accordingly, although the antennas near the DU 1001 and the DU 1002 receive the mobile phone signal, no baseband processing is performed; instead, a data packet is sent to a switching device, so that the switching device sends the data packet to the DU 1008, and baseband collaborative processing is performed in the DU 308. Eventually, a first interface of the DU 1008 sends an S1/X2 signal to the switching device, and the switching device sends the S1 signal to a core network and sends the X2 signal to another base station, thereby completing radio access in a call process.

Based on the radio access system provided in this embodiment of the disclosure, relative to positions of DUs in the conventional radio access network architecture, positions of basic DUs in the system are not changed, where the basic DUs are still deployed in a site, and only extended DUs are added; therefore, a deployment cost is lower than that of the conventional C-RAN architecture. Moreover, relative to the positions of the DUs in the C-RAN access network architecture, the positions of the basic DUs in the system are arranged in a distributed manner; therefore, disaster recovery may be implemented, so that the network architecture has high availability. In addition, the system may be used to implement baseband collaborative processing in the basic DUs, which improves network performance. Moreover, extended DUs are also deployed in the system, and baseband collaborative processing may be performed in the extended DUs, where an extended DU may further act as a baseband resource pool of a basic DU, so that a base station keeps obtaining a new feature, which prolongs a service life of a baseband of an early version, and improves high availability of the system. Moreover, it is unnecessary to go to a site during maintenance and capacity expansion, which reduces a cost. In addition, the system may further support any one standard of a multi-mode radio frequency module of a multi-mode site to independently perform baseband collaborative processing, and may further support access of base stations in a plurality of forms, for example, a distributed base station, a conventional macro base station, and a micro base station.

It should be noted that in some application scenarios, some basic DUs may have a limited baseband processing capability because of too many users; the radio access system provided in the present disclosure may be used not only to perform baseband collaborative processing between sites, but also to form a baseband resource pool only between a basic DU and a basic DU or between a basic DU and an extended DU.

For example, in the radio access system 100 shown in FIG. 1, if a baseband processing capability of the DU 102 is limited, the DU 101 may act as a baseband resource pool of the DU 102. That is, the DU 102 sends a first data packet to the switching device, and after the switching device determines to send the first data packet to the DU 101 for processing, the switching device sends the first data packet to the DU 101, so that the DU 101 processes the first data packet.

Alternatively, for example, in the radio access system 300 shown in FIG. 3, if a baseband processing capability of the DU 301 is limited, the DU 308 may act as a baseband resource pool of the DU 301. That is, the DU 301 sends a first data packet to the switching device 307, and the switching device 307 sends, after determining to send the first data packet to the DU 308 for processing, the first data packet to the DU 308, so that the DU 308 processes the first data packet.

The present disclosure merely provides a simple description of the foregoing case; for details, reference may be made to content that an extended DU acts as a baseband resource pool in Embodiment 2, which is not described in detail herein.

A person skilled in the art may clearly understand that, for the convenience and brevity of description, the apparatus described above is merely described by using the division of the functional modules as an example. In actual applications, the functions may be assigned to different functional modules for implementation according to requirements, that is, the interior structure of the apparatus is divided into different functional modules to perform all or partial functions described above. For a specific working process of the system, the apparatus, and the unit described above, reference may be made to the corresponding process in the foregoing method embodiment, which is not repeated herein.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the disclosure, but are not intended to limit the protection scope of the present application. Any variation or replacement readily figured out by a person skilled in the art within the technical scope disclosed in the present disclosure shall fall within the protection scope of the present application. Therefore, the protection scope of the present application shall be subject to the protection scope of the claims.

What is claimed is:

1. A radio access method for implementing a cloud radio access network (RAN) architecture that includes digital processing units (DUs) deployed in sites of an evolved universal terrestrial radio access network (E-UTRAN) architecture, the method comprises:
   receiving, by a switching device, first and second data packets sent by first and second DUs, respectively, in respective first and second sites, wherein the DUs support the E-UTRAN architecture;
   determining, by the switching device, to send the first data packet to the second DU in the second site for collaborative processing that involves mutual transmission and processing of collaborative data between the first and second DUs,
      wherein the determination is based on a routing policy at the switching device for implementing the cloud RAN architecture based on the DUs arranged to support the E-UTRAN architecture; and
   sending, by the switching device, the first and second data packets to the second DU, so that the second DU performs collaborative processing on the first and second data packets,
      wherein the first and second data packets are of a same data type comprising layer 2 (L2) scheduling data, hard bit data, frequency-domain in-phase-quadrature (IQ) data and time-domain IQ data.

2. The method according to claim 1, wherein the method further comprises:
   receiving, by the switching device, a third data packet sent by a third DU;
   determining, by the switching device, to send the third data packet to a first extended DU for processing, wherein the first extended DU is deployed together with the switching device and outside of the E-UTRAN architecture; and
   sending, by the switching device, the third data packet to the first extended DU, so that the first extended DU processes the third data packet.

3. The method according to claim 1, wherein the method further comprises:
   receiving, by the switching device, a fourth data packet sent by a fourth DU, and receiving a fifth data packet sent by a fifth DU, wherein the fourth data packet and the fifth data packet are of a same data type;
   determining, by the switching device, to send the fourth data packet and the fifth data packet to a second extended DU for collaborative processing, wherein the second extended DU is deployed together with the switching device and outside of the E-UTRAN architecture; and
   sending, by the switching device, the fourth data packet and the fifth data packet to the second extended DU, so that the second extended DU performs collaborative processing on the fourth data packet and the fifth data packet.

4. A switching device in an evolved universal terrestrial radio access network (E-UTRAN) architecture for implementing a cloud radio access network (RAN) architecture using digital processing units (DUs) of the E-UTRAN architecture deployed at distributed sites, wherein the switching device comprises a receiver, a processor, and a transmitter, wherein:
   the receiver is configured to cooperate with the processor to
      receive first and second data packets sent by first and second digital processing units (DUs), respectively, and
      send the first and second data packets to the processor, wherein the first and second DUs are deployed in first and second sites, respectively, of the E-UTRAN architecture;
   the processor is configured to
      receive the first and second data packets sent by the receiver, and
      after determining to send the first and second data packets to the second DU at the second site for collaborative processing that involves mutual transmission and processing of collaborative data between the first and second sites, send the first and second data packets to the transmitter based on a routing policy for implementing the cloud RAN architecture based on the DUs arranged to support the E-UTRAN architecture for collaborative processing; and
   the transmitter is configured to cooperate with the processor to
      receive the first and second data packets sent by the processor, and send the first and second data packets to the second DU so that the second DU performs collaborative processing on the first and second data packets, wherein the first and second data packets are of a same data type comprising layer 2 (L2) scheduling data, hard bit data, frequency-domain in-phase-quadrature (IQ) data and time-domain IQ data.

5. The switching device according to claim 4, wherein:

the receiver is further configured to cooperate with the processor to
receive a third data packet sent by a third DU, and
send the third data packet to the processor;

the processor is further configured to
receive the third data packet sent by the receiver, and
after determining to send the third data packet to a first extended DU for processing, send the third data packet to the transmitter, wherein the first extended DU is deployed together with the switching device and outside of the E-UTRAN architecture; and the transmitter is further configured to cooperate with the processor to
receive the third data packet sent by the receiver, and
send the third data packet to the first extended DU, so that the first extended DU processes the third data packet.

6. The switching device according to claim 4, wherein:

the receiver is further configured to cooperate with the processor to
receive a fourth data packet sent by a fourth DU and a fifth data packet sent by a fifth DU, and
send the fourth data packet and the fifth data packet to the processor, wherein the fourth data packet and the fifth data packet are of a same data type;

the processor is further configured to
receive the fourth data packet and the fifth data packet that are sent by the receiver, and
after determining to send the fourth data packet and the fifth data packet to a second extended DU for collaborative processing, send the fourth data packet and the fifth data packet to the transmitter, wherein the second extended DU is deployed together with the switching device and outside of the E-UTRAN architecture; and the transmitter is further configured to cooperate with the processor to receive the fourth data packet and the fifth data packet that are sent by the processor, and send the fourth data packet and the fifth data packet to the second extended DU, so that the second extended DU performs collaborative processing on the fourth data packet and the fifth data packet.

7. A non-transitory, computer readable medium storing instructions for execution by a processor of a switching device in an evolved universal terrestrial radio access network (E-UTRAN) architecture for implementing a cloud radio access network (RAN) architecture using digital processing units (DUs) deployed to support the E-UTRAN architecture, wherein the instructions, when executed by the processor provide the following:

receive a first data packet sent by a first digital processing unit (DU) and a second data packet sent by a second DU, wherein the first and second DUs are deployed in first and second sites, respectively and support communications based on the E-UTRAN architecture;

determine to send the first data packet and the second data packet to an extended DU for collaborative processing of the first and second data packets, wherein (a) the determination is based on a routing policy at the switching device for implementing the cloud RAN architecture based on the DUs arranged to support the E-UTRAN architecture, (b) the collaborative processing involves mutual transmission and processing of collaborative data between the first and second sites and (c) the second DU is deployed together with the switching device outside of the E-UTRAN architecture, wherein the first and second data packets are of a same data type comprising layer 2(L2) scheduling data, hard bit data, frequency-domain in-phase-quadrature (IQ) data and time-domain IQ data.

8. The non-transitory, computer readable medium according to claim 7, wherein the instructions, when further executed by the processor, provided the following:

receive, by the switching device, a third data packet sent by a third DU outside of the E-UTRAN architecture;

determine, by the switching device, to send the third data packet to a first DU for processing based on the routing policy at the switching device for implementing the cloud RAN architecture based on DUs arranged to support the E-UTRAN architecture; and send, by the switching device, the third data packet to the first DU, so that the first DU processes the third data packet, wherein the first DU is deployed together with the switching device outside of the E-UTRAN architecture.

* * * * *